United States Patent
Lee et al.

(10) Patent No.: US 11,544,204 B2
(45) Date of Patent: Jan. 3, 2023

(54) MEMORY SYSTEM, MEMORY CONTROLLER AND METHOD FOR OPERATING MEMORY CONTROLLER

(71) Applicant: SK hynix Inc., Gyeonggi-do (KR)

(72) Inventors: Do Hyeong Lee, Seoul (KR); Hee Chan Shin, Gyeonggi-do (KR); Young Ho Ahn, Seoul (KR); Yong Seok Oh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 388 days.

(21) Appl. No.: 16/800,393

(22) Filed: Feb. 25, 2020

(65) Prior Publication Data
US 2020/0394074 A1 Dec. 17, 2020

(30) Foreign Application Priority Data

Jun. 13, 2019 (KR) .................. 10-2019-0069921

(51) Int. Cl.
*G06F 13/16* (2006.01)
*G06F 12/02* (2006.01)

(52) U.S. Cl.
CPC ...... *G06F 13/1668* (2013.01); *G06F 12/0246* (2013.01); *G06F 2212/7203* (2013.01); *G06F 2212/7205* (2013.01)

(58) Field of Classification Search
None
See application file for complete search history.

(56) References Cited

U.S. PATENT DOCUMENTS

| 8,713,268 B2* | 4/2014 | Dillow ............... G06F 3/0652 711/152 |
| 11,144,225 B2* | 10/2021 | Oh .................... G06F 3/0634 |
| 2008/0294813 A1* | 11/2008 | Gorobets ............. G06F 12/0246 710/62 |
| 2011/0138100 A1* | 6/2011 | Sinclair ............... G06F 13/1647 711/E12.082 |
| 2017/0046256 A1* | 2/2017 | Horspool ............. G06F 3/0689 |
| 2017/0270042 A1* | 9/2017 | Tseng ................. G06F 12/0253 |

FOREIGN PATENT DOCUMENTS

| KR | 10-2016-0087426 | 7/2016 |
| KR | 10-2016-0094764 | 8/2016 |

OTHER PUBLICATIONS

NVM Express. NVM Express Base Specification. Jun. 2019. Rev. 1.4. pp. 117-121, 304-306. (Year: 2019).*

* cited by examiner

*Primary Examiner* — Nathan Sadler
(74) *Attorney, Agent, or Firm* — IP & T Group LLP

(57) ABSTRACT

A memory system includes a nonvolatile memory set including a nonvolatile memory; and a memory controller configured to control the nonvolatile memory set. The memory controller may write data to a memory block in a target memory block pool in the nonvolatile memory set during a target time period existing between a time at which an operation mode for the nonvolatile memory set is changed from a second operation mode to a first operation mode and a time at which a command including information indicating that a host expects a requested operation to be performed in the first operation mode is received from the host, prevent execution of a background operation for the nonvolatile memory set, when the operation mode is the first operation mode, and control a background operation for the nonvolatile memory set to be executable, when the operation mode is the second operation mode.

20 Claims, 17 Drawing Sheets

MEMORY SYSTEM, MEMORY CONTROLLER AND METHOD FOR OPERATING MEMORY CONTROLLER

CROSS-REFERENCE TO RELATED APPLICATION

The present application claims priority under 35 U.S.C. 119(a) to Korean Patent Application No. 10-2019-0069921, filed in the Korean Intellectual Property Office on Jun. 13, 2019, which is incorporated herein by reference in its entirety.

BACKGROUND

1. Technical Field

Various embodiments generally relate to a memory system, a memory controller and a method for operating the memory controller.

2. Related Art

A memory system operating as a storage device stores data based on a request of a host, such as a computer, a mobile terminal such as a smartphone or a tablet, or any of various other electronic devices. The memory system may be of a type which stores data in a magnetic disk, such as a hard disk drive (HDD), or of a type which stores data in a nonvolatile memory, such as a solid state drive (SDD), a universal flash storage (UFS) device or an embedded MMC (eMMC) device.

The memory system may further include a memory controller for controlling a memory device. The memory controller may receive a command from the host, and may perform or control an operation for reading, writing or erasing data with respect to a volatile memory or a nonvolatile memory in the memory system, based on the received command.

For various reasons, the memory controller may perform a background operation (e.g., garbage collection, read reclaim or wear leveling) while executing an operation of reading, writing or erasing data. In this case, a problem may be caused in that, due to the background operation, a time required to execute the operation of reading, writing or erasing data increases, thereby increasing a delay time for the memory controller to process a command received from the host. However, since the host cannot anticipate or predict when the memory controller will perform the background operation, there is a problem in that the host cannot prepare for such an increase in delay time.

SUMMARY

Various embodiments are directed to a memory system, a memory controller and a method for operating the memory controller, capable of preventing or minimizing a problem in which states determined by a host and the memory controller during a specific time period do not coincide with each other.

Also, various embodiments are directed to a memory system, a memory controller and a method for operating the memory controller, capable of enabling a host to prepare for a situation in which a delay time becomes longer than expected.

In one aspect, embodiments of the disclosure may provide a memory system including: a nonvolatile memory set including at least one nonvolatile memory; and a memory controller configured to control the nonvolatile memory set.

The memory controller may write data to a memory block in a target memory block pool in the nonvolatile memory set during a target time period between 1) a time at which an operation mode for the nonvolatile memory set is changed from a second operation mode to a first operation mode and 2) a time at which a command including information indicating that a host expects a requested operation to be performed in the first operation mode is received from the host.

The memory controller may prevent execution of a background operation for the nonvolatile memory set, when the operation mode is the first operation mode, and may control a background operation for the nonvolatile memory set to be executable, when the operation mode is the second operation mode.

The memory controller may be configured to write data to a memory block not in the target memory block pool during a time other than the target time period.

When an operation mode setting command instructing the memory controller to set the operation mode for the nonvolatile memory set to the first operation mode is received, the memory controller may change the operation mode from the second operation mode to the first operation mode.

During the target time period, the memory controller may not change a value of a write attribute indicating information on a number of write operations that may be allowable in the first operation mode.

In another aspect, embodiments of the disclosure may provide a memory controller including: a memory interface configured to communicate with a nonvolatile memory set including at least one nonvolatile memory; and a control circuit configured to control the nonvolatile memory set.

The control circuit may write data to a memory block in a target memory block pool in the nonvolatile memory set during a target time period existing between 1) a time at which an operation mode for the nonvolatile memory set is changed from a second operation mode to a first operation mode and 2) a time at which a command including information indicating that a host expects a requested operation to be performed in the first operation mode is received from the host.

The control circuit may prevent execution of a background operation for the nonvolatile memory set when the operation mode is the first operation mode, and may control a background operation for the nonvolatile memory set to be executable, when the operation mode is the second operation mode.

The control circuit may be configured to write data to a memory block not in the target memory block pool, during a time other than the target time period.

When an operation mode setting command instructing the control circuit to set the operation mode for the nonvolatile memory set to the first operation mode is received, the control circuit may change the operation mode from the second operation mode to the first operation mode.

During the target time period, the control circuit may not change a value of a write attribute indicating information on a number of write operations that may be allowable in the first operation mode.

In still another aspect, embodiments of the disclosure may provide a method for operating a memory controller suitable for controlling a nonvolatile memory set including at least one nonvolatile memory.

The method for operating a memory controller may include changing an operation mode for the nonvolatile memory set from a second operation mode to a first operation mode.

The method for operating a memory controller may include receiving, from a host, a command including information indicating that the host expects a requested operation to be performed in the first operation mode.

The method for operating a memory controller may write data to a memory block pool in the nonvolatile memory set during a target time period existing between 1) a time at which the operation mode for the nonvolatile memory set is changed from the second operation mode to the first operation mode and 2) a time at which the command including information indicating that the host expects performing in the first operation mode is received from the host.

A background operation for the nonvolatile memory set maybe prevented when the operation mode is the first operation mode, and a background operation for the nonvolatile memory set may be controlled to be executable when the operation mode is the second operation mode.

Data may be written to a memory block not in the target memory block pool, during a time other than the target time period.

In still another aspect, embodiments of the disclosure may provide a method for operating a controller.

The method for operating a controller may change an operation mode of a memory device from an initial operation mode to a changed operation mode.

The method for operating a controller may synchronize the changed operation mode.

The method for operating a controller may control the memory device to perform a foreground operation on a first storage region in the changed operation mode.

The method for operating a controller may return the operation mode to the initial operation mode when the foreground operation meets a set condition in the changed mode.

While the method for operating a controller may control the memory device to perform a foreground operation on a first storage region in the changed operation mode, the method for operating a controller may control, during a transition interval, the memory device to perform a write operation on a second storage region.

The transition interval may be between the changing and the synchronizing.

Execution of a background operation of the memory device is prevented in the changed mode.

According to the embodiments of the disclosure, it is possible to provide a memory system, a memory controller and a method for operating the memory controller, capable of preventing a problem in which states determined by a host and the memory controller during a specific time period do not coincide with each other.

Also, according to the embodiments of the disclosure, it is possible to provide a memory system, a memory controller and a method for operating the memory controller, capable of enabling a host to prepare for a situation in which a delay time becomes longer than expected.

DETAILED DESCRIPTION

Various embodiments of the disclosure are described below in detail with reference to the accompanying drawings. Throughout the specification, reference to "an embodiment," "another embodiment" or the like is not necessarily to only one embodiment, and different references to an such phrase are necessarily to the same embodiment(s).

Figure 1:
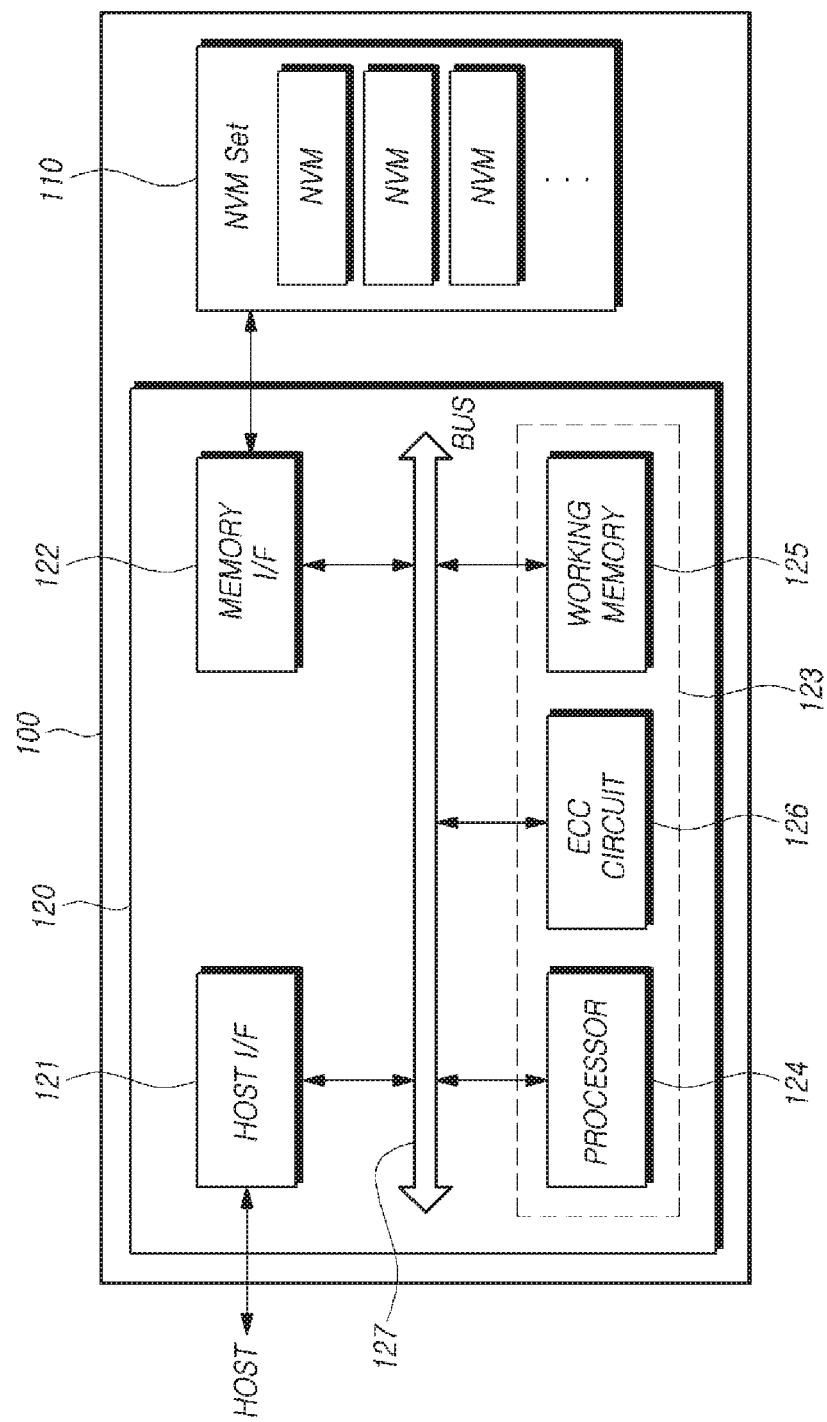
FIG. 1 is a schematic diagram illustrating a configuration of a memory system in accordance with an embodiment of the disclosure.

FIG. 1 is a schematic diagram illustrating a configuration of a memory system in accordance with an embodiment of the disclosure.

Referring to FIG. 1, a memory system 100 may include a nonvolatile memory set 110, and a memory controller 120 which controls the nonvolatile memory set 110.

The nonvolatile memory set 110 may include one or more nonvolatile memories NVM, each of which may include a plurality of memory blocks. The nonvolatile memory set 110 may operate in response to the control of the memory controller 120.

Operations of the nonvolatile memory set 110 may include, for example, a read operation, a program operation (also referred to as a write operation) and an erase operation.

Each of the nonvolatile memories NVM included in the nonvolatile memory set 110 may include a memory cell array including a plurality of memory cells (also simply referred to as "cells") which store data. Such a memory cell array may be disposed in memory blocks.

For example, the nonvolatile memory NVM may be realized as any of various types such as a NAND flash memory, a vertical NAND flash memory, a NOR flash memory, a phase-change memory (PRAM), a magnetoresistive random access memory (MRAM) and/or a ferroelectric random access memory (FRAM).

The nonvolatile memory NVM may be realized in a three-dimensional array structure. The embodiments of the disclosure may be applied to not only a flash memory device in which a charge storage layer is configured by a conductive floating gate but also a charge trap flash (CTF) in which a charge storage layer is configured by a dielectric layer.

The nonvolatile memory set 110 may be configured to receive a command, an address and the like from the memory controller 120 and access a region in the memory cell array which is selected by the address. In other words, the nonvolatile memory set 110 may perform an operation corresponding to the command, for the region selected by the address.

For example, the nonvolatile memory set 110 may perform a program operation, a read operation and an erase operation. In the program operation, the nonvolatile memory set 110 may program data in a region selected by the address. In the read operation, the nonvolatile memory set 110 may read data from the region selected by the address. In the erase operation, the nonvolatile memory set 110 may erase data stored in the region selected by the address.

The memory controller 120 may control write (program), read, erase and background operations for the nonvolatile memory set 110. For example, the background operation may include at least one among a garbage collection (GC) operation, a wear leveling (WL) operation, a bad block management (BBM) operation, and the like.

The memory controller 120 may control the operation of the nonvolatile memory set 110 according to a request of a host. Alternatively, the memory controller 120 may control the operation of the nonvolatile memory set 110 even in the absence of a request of the host.

The memory controller 120 and the host may be separate components. Alternatively, the memory controller 120 and the host may be integrated into a single device. By way of example, the following description is given in the context of the memory controller 120 and the host being separate components.

Referring to FIG. 1, the memory controller 120 may include a memory interface 122, a control circuit 123, and may further include a host interface 121.

The host interface 121 provides an interface for communication with the host.

When receiving a command from the host, the control circuit 123 may receive the command through the host interface 121, and then, may perform an operation of processing the received command.

The memory interface 122 is coupled with the nonvolatile memory set 110 and thereby provides an interface for communication with the nonvolatile memory set 110. That is to say, the memory interface 122 may be configured to provide the interface between the nonvolatile memory set 110 and the memory controller 120 in response to the control of the control circuit 123.

The control circuit 123 may perform the general control operations of the memory controller 120, thereby controlling the operations of the nonvolatile memory set 110. To this end, for instance, the control circuit 123 may include at least one of a processor 124 and a working memory 125, and as the case may be, may further include an error detection and correction circuit (ECC circuit) 126.

The processor 124 may control general operations of the memory controller 120, and may perform a logic calculation. The processor 124 may communicate with the host through the host interface 121, and may communicate with the nonvolatile memory set 110 through the memory interface 122.

The processor 124 may perform the function of a flash translation layer (FTL). The processor 124 may translate a logical block address (LBA) provided by the host, into a physical block address (PBA), through the flash translation layer (FTL). The flash translation layer (FTL) may receive the logical block address (LBA) and translate the received logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 is configured to randomize data received from the host. For example, the processor 124 may randomize data received from the host, by using a randomizing seed. Randomized data to be stored is provided to the nonvolatile memory set 110 and is programmed to the memory cell array.

The processor 124 is configured to derandomize data received from the nonvolatile memory set 110, in a read operation. For example, the processor 124 may derandomize data received from the nonvolatile memory set 110, by using a derandomizing seed. Derandomized data may be outputted to the host.

The processor 124 may control the operation of the memory controller 120 by executing firmware. In other words, in order to control general operations of the memory controller 120 and perform a logic calculation, the processor 124 may execute (drive) firmware loaded to the working memory 125 upon booting.

The firmware as a program to be executed in the memory system 100 may include various functional layers.

For example, the firmware may include at least one among a flash translation layer (FTL) which performs a translating function between a logical address requested to the memory system 100 from the host and a physical address of the nonvolatile memory set 110, a host interface layer (HIL) which serves to analyze a command requested to the memory system 100 as a storage device from the host and transfers the command to the flash translation layer (FTL), and a flash interface layer (FIL) which transfers a command instructed from the flash translation layer (FTL) to the nonvolatile memory set 110.

For instance, such firmware may be stored in the nonvolatile memory set 110 and then be loaded to the working memory 125.

The working memory 125 may store firmware, program code, a command and data to drive the memory controller 120. The working memory 125, for example, as a volatile memory, may include at least one among an SRAM (static RAM), a DRAM (dynamic RAM) and an SDRAM (synchronous DRAM).

The error detection and correction circuit 126 may be configured to detect an error bit in target data and correct the detected error bit, by using an error correction code. Here, the target data may be, for example, data stored in the working memory 125, data read from the nonvolatile memory set 110, or the like.

The error detection and correction circuit 126 may be realized to decode data by using an error correction code. The error detection and correction circuit 126 may be realized by any of various code decoders. For example, a decoder which performs unsystematic code decoding or a decoder which performs systematic code decoding may be used.

For example, the error detection and correction circuit 126 may detect error bit(s) for each read data, in the unit of sector. Namely, each read data may be constituted by a plurality of sectors. A sector may mean a data unit smaller than a page as a read unit of a flash memory. Sectors constituting each read data may be matched with one another by the medium of an address.

The error detection and correction circuit 126 may calculate a bit error rate (BER), and may determine whether an error is correctable or not, in the unit of sector. For example, in the case where a bit error rate (BER) is higher than a reference value, the error detection and correction circuit 126 may determine a corresponding sector as being uncorrectable or a fail. On the other hand, in the case where a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer information (for example, address information) on a sector which is determined to be uncorrectable, to the processor 124.

A bus 127 may be configured to provide channels among the components 121, 122, 124, 125 and 126 of the memory controller 120. The bus 127 may include, for example, a control bus for transferring various control signals, commands and the like and a data bus for transferring various data.

The above-described components 121, 122, 124, 125 and 126 of the memory controller 120 are examples. One or more of these components may be omitted, and/or two or more of such components may be integrated into one. Of course, the memory controller 120 may include one or more additional components.

A nonvolatile memory included in the nonvolatile memory set 110 is described in further detail below with reference to FIG. 2.

Figure 2:
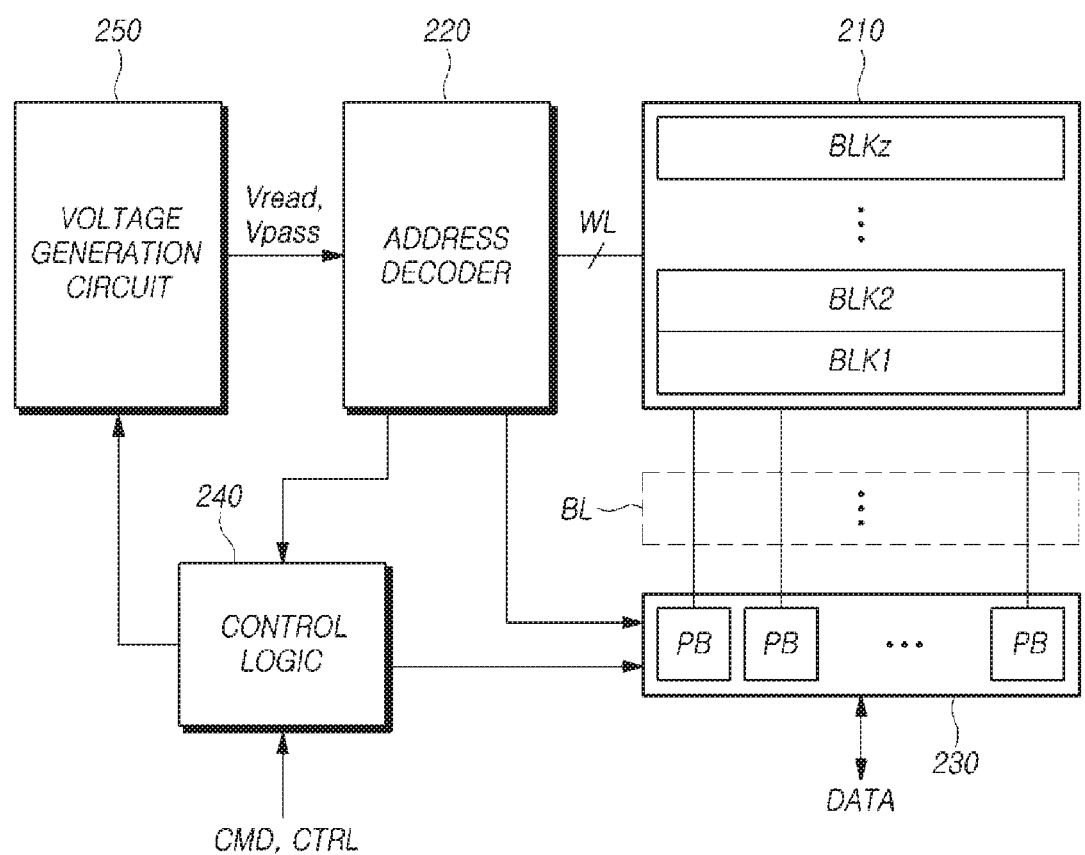
FIG. 2 is a diagram schematically illustrating a nonvolatile memory in accordance with an embodiment of the disclosure.

FIG. 2 is a diagram schematically illustrating a nonvolatile memory in accordance with an embodiment of the disclosure.

Referring to FIG. 2, the nonvolatile memory may include a memory cell array 210, an address decoder 220, a read and write circuit 230, control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed in an intersecting pattern, and a plurality of memory cells (MC) may be arranged at the intersections.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, which may have vertical channel structures.

The memory cell array 210 may be configured as a two-dimensional structure or a three-dimensional structure.

Each of the plurality of memory cells included in the memory cell array 210 may store at least 1-bit data. For instance, each of the plurality of memory cells in the memory cell array 210 may be a single level cell (SLC) storing 1-bit data, a multi-level cell (MLC) which stores 2-bit data, a triple level cell (TLC) which stores 3-bit data, or a quad level cell (QLC) which stores 4-bit data. In another embodiment, the memory cell array 210 may include a plurality of memory cells, each of which stores 5 or more-bit data.

Referring to FIG. 2, the address decoder 220, the read and writhe circuit 230, the control logic 240 and the voltage generation circuit 250 may collectively operate as a peripheral circuit which drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the nonvolatile memory. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block in a read voltage applying operation during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the nonvolatile memory may be performed in the unit of page. An address received when a read operation or a program operation is requested may include at least one among a block address, a row address and a column address.

The address decoder 220 may select one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit which includes a plurality of page buffers PB. The read and write circuit 230 may include data buffers which perform a data processing function, and as the case may be, may further include cache buffers which perform a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, that the amounts of current flowing depending on the programmed states of the corresponding memory cells are changed.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the nonvolatile memory. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the nonvolatile memory.

The control logic 240 may be configured to control general operations of the nonvolatile memory in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Figure 3:
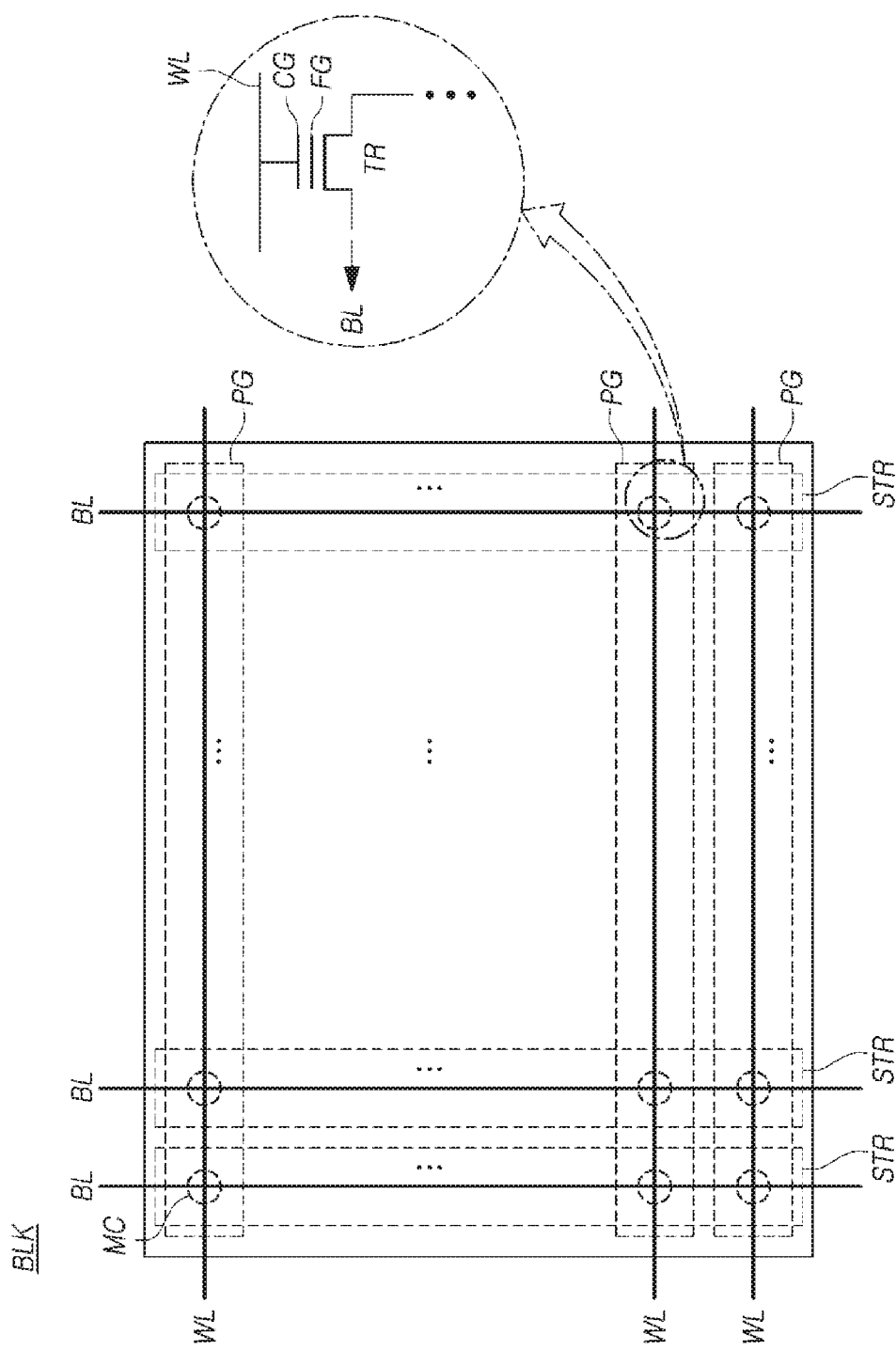
FIG. 3 is a diagram illustrating a structure of a memory block included in the nonvolatile memory in accordance with an embodiment of the disclosure.

FIG. 3 is a schematic diagram illustrating a structure of a memory block in the nonvolatile memory in accordance with an embodiment of the disclosure.

Referring to FIG. 3, the memory block BLK in the nonvolatile memory may be configured, for example, as a plurality of pages PG and a plurality of strings STR respectively disposed in different directions such that pages and strings intersect.

The plurality of pages PG correspond to a plurality of word lines WL, and the plurality of strings STR correspond to a plurality of bit lines BL.

In the memory block BLK, the plurality of word lines WL and the plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

As the plurality of word lines WL and the plurality of bit lines BL intersect with each other, a plurality of memory cells MC may be defined at such intersections. A transistor TR may be disposed in each memory cell MC.

For example, the transistor TR disposed in each memory cell MC may include a drain, a source and a gate. The drain (or source) of the transistor TR may be coupled with a corresponding bit line BL directly or via another transistor TR. The source (or drain) of the transistor TR may be coupled with a source line (which may be the ground) directly or via another transistor TR. The gate of the transistor TR may include a floating gate FG which is surrounded by a dielectric and a control gate CG to which a gate voltage is applied from a word line WL.

In each of the plurality of memory blocks BLK1 to BLKz, a first select line (also referred to as a source select line or a drain select line) may be additionally disposed outside a first outermost word line more adjacent to the read and write circuit 230, and a second select line (also referred to as a drain select line or a source select line) may be additionally disposed outside a second outermost word line.

As the case may be, at least one dummy word line may be additionally disposed between the first outermost word line and the first select line. At least one dummy word line may also be additionally disposed between the second outermost word line and the second select line.

When the nonvolatile memory set 110 has a memory block structure illustrated in FIG. 3, a read operation and a program operation (write operation) may be performed in the unit of page, and an erase operation may be performed in the unit of memory block.

Figure 4:
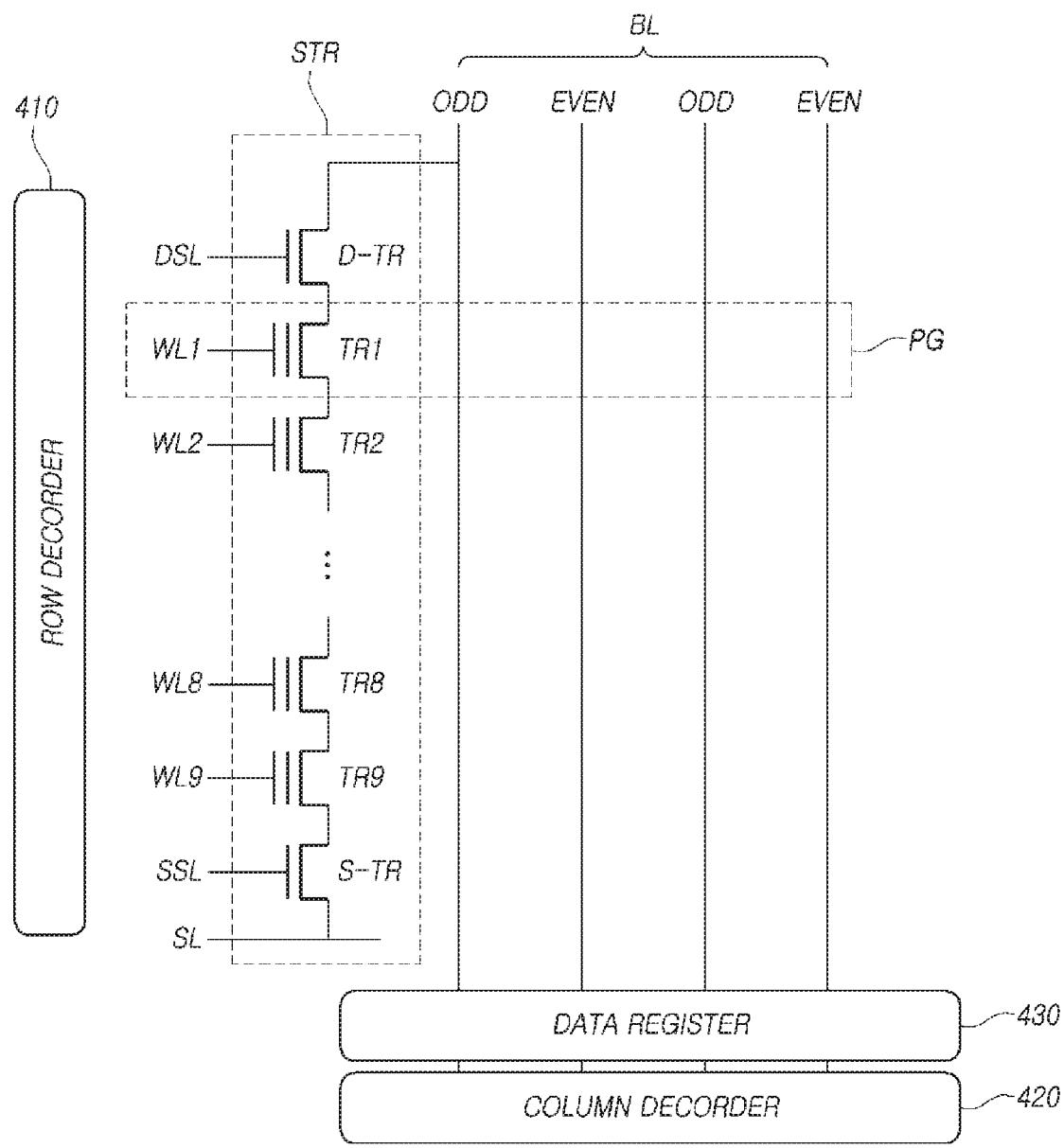
FIG. 4 is a diagram illustrating a structure of word lines and bit lines of a nonvolatile memory set in accordance with an embodiment of the disclosure.

FIG. 4 is a diagram illustrating a structure of word lines WL and bit lines BL of the nonvolatile memory set 110 in accordance with an embodiment of the disclosure.

Referring to FIG. 4, in the nonvolatile memory set 110, there exists a core area in which memory cells MC are gathered and an auxiliary area which corresponds to the remaining area excluding the core area and supports the operation of the memory cell array 210.

The core area may be configured by pages PG and strings STR. In such a core area, a plurality of word lines WL1 to WL9 and a plurality of bit lines BL are disposed to intersect with each other.

The plurality of word lines WL1 to WL9 may be coupled with a row decoder 410, and the plurality of bit lines BL may be coupled with a column decoder 420. A data register 430 corresponding to the read and write circuit 230 may be disposed between the plurality of bit lines BL and the column decoder 420.

The plurality of word lines WL1 to WL9 correspond to a plurality of pages PG.

For example, as illustrated in FIG. 4, each of the plurality of word lines WL1 to WL9 may correspond to one page PG. Alternatively, in the case where the size of each of the plurality of word lines WL1 to WL9 is large, each of the plurality of word lines WL1 to WL9 may correspond to at least two (for example, two or four) pages PG. Page PG is a minimum unit in performing a program operation and a read operation. In the program operation and the read operation, all memory cells MC in the same page PG may simultaneously perform the corresponding operations.

The plurality of bit lines BL may be coupled with the column decoder 420 while being identified as odd-numbered bit lines BL and even-numbered bit lines BL.

In order to access memory cells MC, first, an address may be entered into the core area through the row decoder 410 and the column decoder 420 via an input/output terminal, and may designate target memory cells. Designating target memory cells means accessing memory cells MC positioned at sites where the word lines WL1 to WL9 coupled with the row decoder 410 and the bit lines BL coupled with the column decoder 420 intersect with each other, to program data to the memory cells MC or read out programmed data from the memory cells MC.

A page PG in a first direction (e.g., a horizontal direction as illustrated in FIG. 4) is bundled (coupled) by a common line which is referred to as a word line WL, and a string STR in a second direction (e.g., a vertical direction as illustrated in FIG. 4) is bundled (coupled) by a common line which is referred to as a bit line BL. Being bundled in common means that corresponding memory cells MC are structurally coupled with one another by the same material and also the same voltage is simultaneously applied to the memory cells MC when a voltage is applied thereto. Of course, as a memory cell MC which is coupled in series and is positioned at an intermediate position or a last position is influenced by a voltage drop in a preceding memory cell MC, voltages applied to a first memory cell MC and a last memory cell MC may be slightly different from each other.

Since data is programmed and read via the data register 430 in all data processing operations of the nonvolatile memory set 110, the data register 430 plays a key role. If data processing of the data register 430 is delayed, all the other areas need to wait until the data register 430 completes the data processing. Also, if the performance of the data register 430 is degraded, the overall performance of the nonvolatile memory set 110 may be degraded.

Referring to the illustration of FIG. 4, in one string STR, a plurality of transistors TR1 to TR9 which are coupled with the plurality of word lines WL1 to WL9 may exist. Areas where the plurality of transistors TR1 to TR9 exist correspond to memory cells MC. Each of the plurality of transistors TR1 to TR9 includes a control gate CG and a floating gate FG as described above.

The plurality of word lines WL1 to WL9 include two outermost word lines WL1 and WL9. A first select line DSL may be additionally disposed outside a first outermost word line WL1 which is more adjacent to the data register 430 in terms of signal path, and a second select line SSL may be additionally disposed outside a second outermost word line WL9.

A first select transistor D-TR which is on-off controlled by the first select line DSL has only a gate electrode coupled with the first select line DSL and does not include a floating gate FG. A second select transistor S-TR which is on-off controlled by the second select line SSL has only a gate electrode coupled with the second select line SSL and does not include a floating gate FG.

The first select transistor D-TR serves as a switch which turns on or off the coupling between a corresponding string STR and the data register 430. The second select transistor S-TR serves as a switch which turns on or off the coupling between the corresponding string STR and a source line SL. That is to say, the first select transistor D-TR and the second select transistor S-TR are respectively positioned at opposite ends of the corresponding string STR, and serve as gatekeepers which couple and decouple signals.

In a program operation, because it is necessary to fill electrons in a target memory cell MC of a bit line BL which is to be programmed, the memory system 100 turns on the first select transistor D-TR by applying a turn-on voltage Vcc to the gate electrode of the first select transistor D-TR, and turns off the second select transistor S-TR by applying a turn-off voltage (e.g., 0V) to the gate electrode of the second select transistor S-TR. Each of the turn-on and turn-off voltage may be predetermined.

In a read operation or a verify operation, the memory system 100 turns on both the first select transistor D-TR and the second select transistor S-TR. Accordingly, since current may be discharged to the source line SL corresponding to the ground through the corresponding string STR, a voltage level of the bit line BL may be measured. However, in the read operation, there may be a time difference between on-off timings of the first select transistor D-TR and the second select transistor S-TR.

In an erase operation, the memory system 100 may supply a set voltage (e.g., +20V) to a substrate through the source line SL. In the erase operation, the memory system 100 floats both the first select transistor D-TR and the second select transistor S-TR, thereby providing infinite resistance. Accordingly, the memory system 100 is structured such that the first select transistor D-TR and the second select transistor S-TR do not function and electrons may operate due to a potential difference only between a floating gate FG and the substrate.

Figure 5:
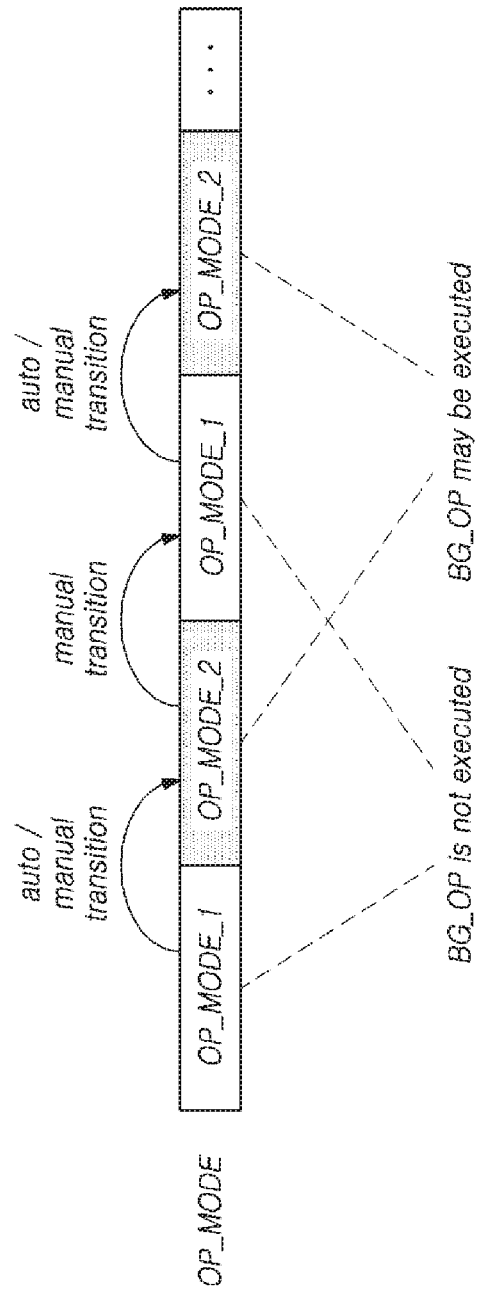
FIG. 5 is a diagram to assist in the explanation of an operation mode for a nonvolatile memory set in accordance with an embodiment of the disclosure.

FIG. 5 is schematic a diagram to assist in the explanation of an operation mode for the nonvolatile memory set 110 in accordance with an embodiment of the disclosure.

Referring to FIG. 5, an operation mode OP_MODE for the nonvolatile memory set 110 may be a first operation mode OP_MODE_1 or a second operation mode OP_MODE_2.

The memory controller 120 may determine the operation mode OP_MODE for the nonvolatile memory set 110 to be either the first operation mode OP_MODE_1 or the second operation mode OP_MODE_2.

The memory controller 120 may manage the operation mode OP_MODE in various ways. For example, the memory controller 120 may manage the operation mode OP_MODE as a flag value, and as another example, the memory controller 120 may manage the operation mode OP_MODE as a status window.

As time passes, the operation mode OP_MODE for the nonvolatile memory set 110 may be changed from the first operation mode OP_MODE_1 to the second operation mode OP_MODE_2, or vice versa.

In this regard, the change from the first operation mode OP_MODE_1 to the second operation mode OP_MODE_2 may be performed manually or may be performed automatically when a set condition is satisfied. On the other hand, the change from the second operation mode OP_MODE_2 to the first operation mode OP_MODE_1 may be performed manually and may not be performed automatically.

The difference between the first operation mode OP_MODE_1 and the second operation mode OP_MODE_2 is as follows.

In the first operation mode OP_MODE_1, the memory controller 120 may control a background operation BG_OP for the nonvolatile memory set 110 not to be executed. The background operation BG_OP may be, for example, garbage collection (GC), read reclaim (RR), wear leveling (WL), or the like.

In this case, in a process in which the memory controller 120 processes a command (e.g., a read command/a write command) received from the host, latency that would otherwise occur as a result of execution of a background operation does not occur. Therefore, since the memory controller 120 may process the command received from the host, within an expected time calculated in advance, the memory controller 120 may provide high quality of service (QoS) to the host. Further, the host may also anticipate that the command transmitted to the memory controller 120 will be processed within an expected time calculated in advance.

On the other hand, in the second operation mode OP_MODE_2, the memory controller 120 may control a background operation BG_OP for the nonvolatile memory set 110 to be executable.

In this case, in a process in which the memory controller 120 processes a command (e.g., a read command/a write command) received from the host, a latency caused as the background operation BG_OP is executed may occur. Thus, a time for the memory controller 120 to process the command received from the host may exceed an expected time calculated in advance.

Further, in the case where a current operation mode OP_MODE is the second operation mode OP_MODE_2, the host may also expect that the memory controller 120 may perform a background operation and determine that there is a possibility that the time to process the command transmitted to the memory controller 120 may exceed an expected processing time calculated in advance. Therefore, the host may prepare for an increased delay due to the background operation.

That is to say, the memory controller 120 may change the operation mode OP_MODE to the first operation mode OP_MODE_1 or the second operation mode OP_MODE_2, and may control a background operation to be performed only when the operation mode OP_MODE is the second operation mode OP_MODE_2. This is different from the operation of a conventional memory controller which interrupts a background operation when a read or write command is received from a host while executing the background operation in an idle state and resumes the background operation when the idle state is entered again after the received command is processed.

When the memory controller 120 performs a background operation in the second operation mode OP_MODE_2, a victim memory block as a target of the background operation may be determined in various ways.

As an example, it is assumed that a read reclaim operation should be performed for a memory block of the number of cumulative reads (read count) is equal to or greater than a threshold read count value of 100. In this case, while the memory controller 120 may select, as victim memory blocks, only memory blocks of which read counts are equal to or greater than the threshold read count value of 100, the memory controller 120 may select, as victim memory blocks, even memory blocks of which read counts are different from the threshold read count value by a set value or less. For example, the memory controller 120 may select, as victim memory blocks, even memory blocks of which read counts are, e.g., 90, which is 10 less than 100.

As another example, it is assumed that, if the number of free memory blocks capable of being written with data is less than 20, garbage collection should be executed until the number of free memory blocks becomes equal to or greater than 20.

In this case, while the memory controller 120 may execute garbage collection by selecting victim memory blocks until the number of free memory blocks becomes 20, the memory controller 120 may execute garbage collection by selecting victim memory blocks until the number of free memory blocks becomes, e.g., 25, which is 5 more than the minimum number of 20.

The reason why, as such, even more memory blocks than may be immediately needed for a background operation are selected as victim memory blocks is to increase a time during which the memory set 110 operates in the first operation mode OP_MODE_1 after the background operation is completed. This is because, as many victim memory blocks are selected in the background operation, a time until a background operation is required again after the present background operation is completed increases.

The above-described changes in an operation mode are described with reference to the flow chart of FIG. 6.

Figure 6:
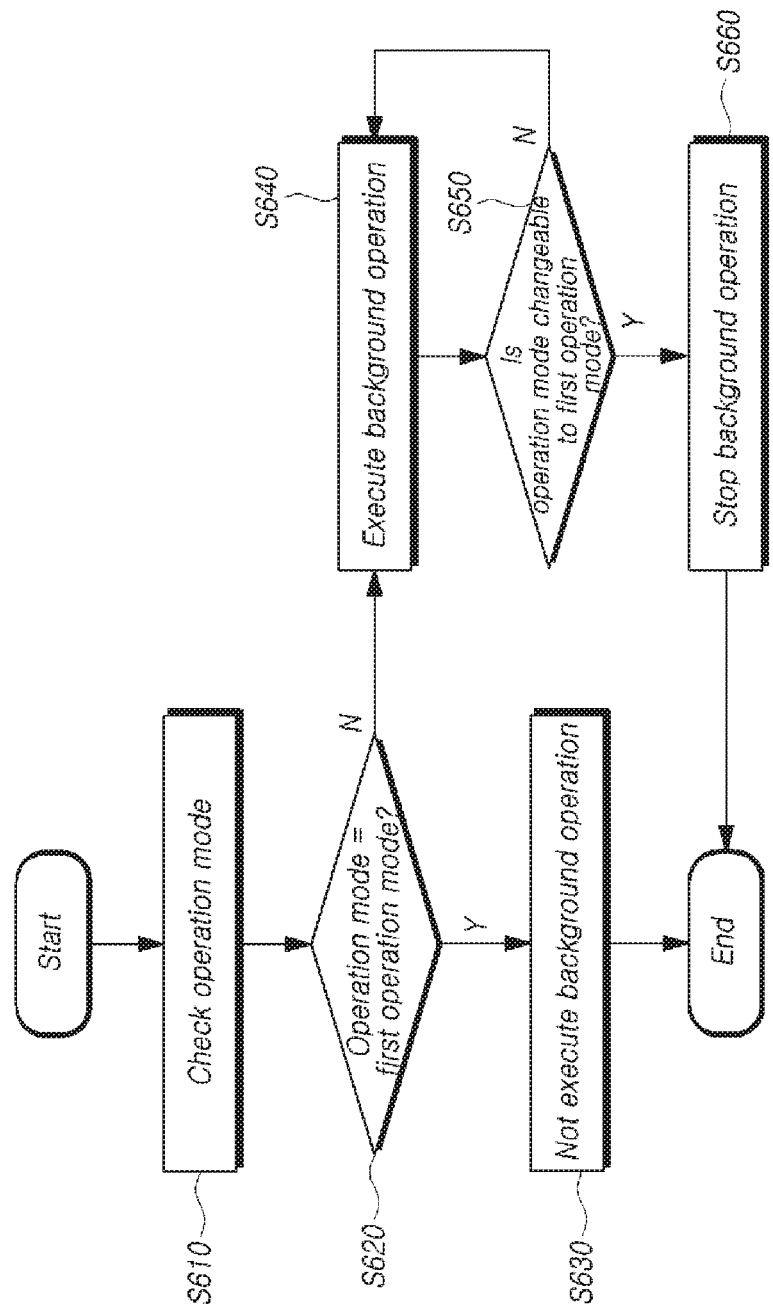
FIG. 6 is a flow chart to assist in the explanation of an operation based on an operation mode for a nonvolatile memory set in accordance with an embodiment of the disclosure.

FIG. 6 is a flow chart to assist in the explanation of an operation based on an operation mode for the nonvolatile memory set in accordance with an embodiment of the disclosure.

Referring to FIG. 6, first, the memory controller 120 may check a current operation mode (S610).

The memory controller 120 determines whether the operation mode OP_MODE is the first operation mode OP_MODE_1 (S620).

If the current operation mode OP_MODE is the first operation mode OP_MODE_1 (S620-Y), the memory controller 120 does not execute a background operation (S630).

On the other hand, in the case where the current operation mode OP_MODE is not the first operation mode OP_MODE_1 (S620-N), that is, the current operation mode OP_MODE is the second operation mode OP_MODE_2, the memory controller 120 may execute a background operation (S640).

After the step S640, the memory controller 120 determines whether the operation mode OP_MODE may be changed from the second operation mode OP_MODE_2 to the first operation mode OP_MODE_1 (S650).

If it is determined that the operation mode OP_MODE may be changed to the first operation mode OP_MODE_1 (S650-Y), the memory controller 120 may stop the background operation that is currently being executed (S660). On the other hand, if it is determined that the operation mode OP_MODE may not be changed to the first operation mode OP_MODE_1 (S650-N), the memory controller 120 may perform the step S640 again until the nonvolatile memory set 110 is in a state in which the operation mode OP_MODE may be changed to the first operation mode OP_MODE_1.

When the operation mode OP_MODE for the nonvolatile memory set 110 is changed as described above, an operation of writing data to the nonvolatile memory set 110 may also be changed.

A detailed operation of writing data to the nonvolatile memory set 110 is described based on the position of a memory block to which the data is to be written.

Figure 7:
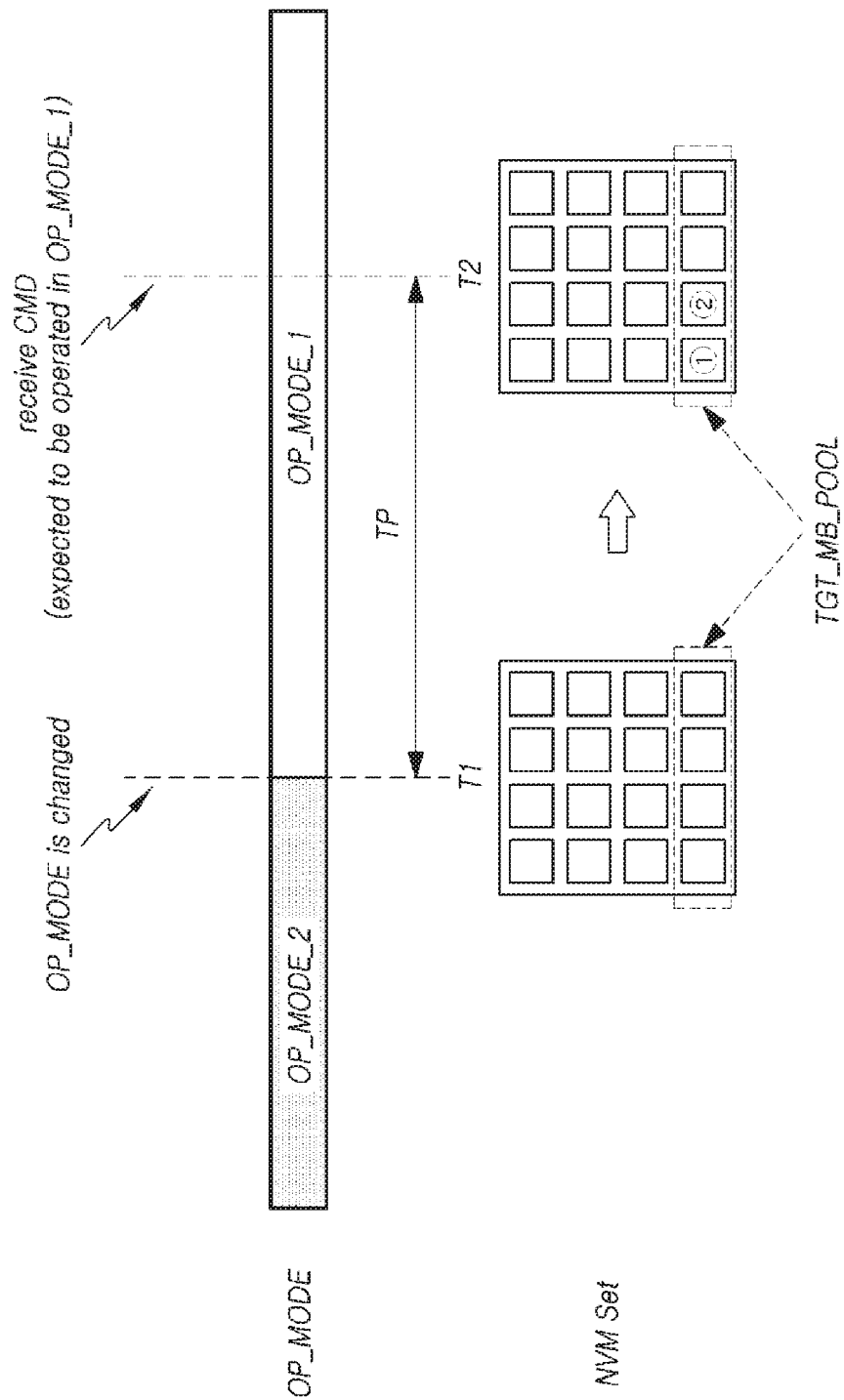
FIGS. 7 and 8 are diagrams to assist in the explanation of an operation of writing data to a nonvolatile memory set in accordance with an embodiment of the disclosure.
Figure 8:
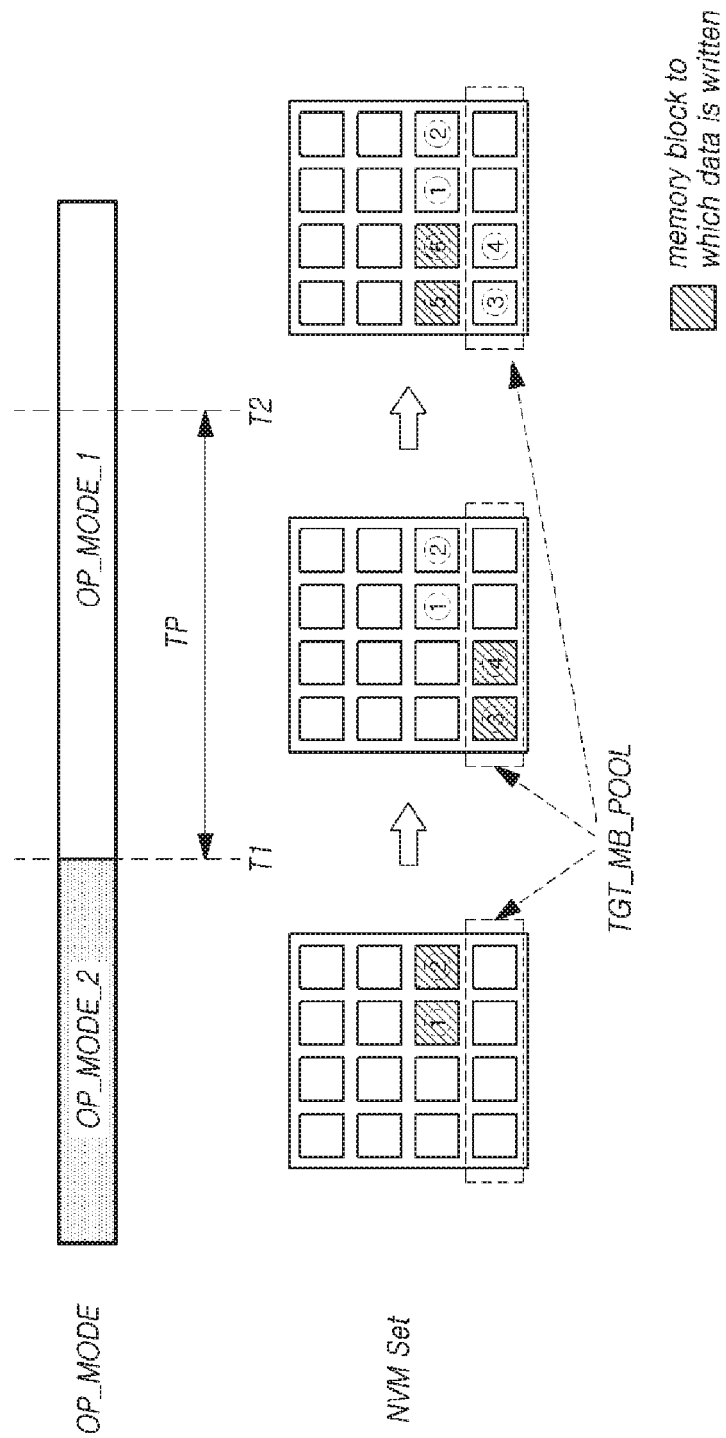

FIGS. 7 and 8 are diagrams to assist in the explanation of examples of an operation of writing data to the nonvolatile memory set in accordance with an embodiment of the disclosure.

When the memory controller 120 writes data based on a write command received from the host or a background operation (e.g., garbage collection/wear leveling), the memory controller 120 may write the data to a memory block included in the nonvolatile memory set 110. Since the nonvolatile memory set 110 may include one or more nonvolatile memories NVM and each nonvolatile memory NVM may include a plurality of memory blocks, the nonvolatile memory set 110 may include a plurality of memory blocks.

In the embodiments of the disclosure, the memory controller 120 may set a target time period TP defined by 1) a time T1 at which the operation mode OP_MODE for the nonvolatile memory set 110 is changed from the second operation mode OP_MODE_2 to the first operation mode OP_MODE_1 and 2) a time T2 at which a command including information indicating that the host expects a requested operation to be performed in the first operation mode OP_MODE_1 is received from the host.

The target time period TP means a time interval from when the memory controller 120 changes the operation mode OP_MODE for the nonvolatile memory set 110 to the first operation mode OP_MODE_1 to when the memory system 100 becomes actually ready to service a command (e.g., a write command/a read command) in the first operation mode OP_MODE_1. The command including information indicating that the host expects a requested operation to be performed in the first operation mode OP_MODE_1 may be a notification that synchronization of the first operation mode between the host and the memory system 100 is established and thus the host is ready for the first operation mode OP_MODE_1. The target time period TP may be the time for the synchronization between the host and the memory system 100 for the first operation mode OP_MODE_1 to be completed.

The target time period TP may be determined in a range within a set maximum target time period.

The host may request a value of the maximum target time period to be set. The memory controller 120 may determine whether a value of the maximum target time period requested by the host to be set is valid, and may respond a determination result to the host.

A value of the maximum target time period may be updated in the first operation mode OP_MODE_1. In the case where the host requests setting for a value of the maximum target time period, in the second operation mode OP_MODE_2, the memory controller 120 may update a value of the maximum target time period according to the request of the host, when the operation mode OP_MODE is subsequently changed again to the first operation mode OP_MODE_1.

During the target time period TP, since the memory controller 120 has already changed the operation mode OP_MODE to the first operation mode OP_MODE_1, the memory controller 120 may determine that an operation of writing data is performed in the first operation mode OP_MODE_1. However, since the host has not yet provide the memory controller 120 with a command to be executed in the first operation mode OP_MODE_1, the host cannot expect that an operation of writing data will be performed in the first operation mode OP_MODE_1.

In other words, during the target time period TP, there is a possibility that the host and the memory controller 120 differently determine the operation mode OP_MODE in which an operation of writing data is to be performed.

Therefore, the memory controller 120 may use various methods to prevent a problem that may occur due to a difference in determination of the operation mode OP_MODE between the host and the memory controller 120.

For example, the memory controller 120 may control an operation of writing data not to be performed during the target time period TP described above. In this case, a problem that may otherwise occur due to a difference in determination of the operation mode OP_MODE between the host and the memory controller 120 does not occur. However, in such a method, since the memory controller 120 may write data but does not write data during the target time period TP, loss in data write performance may be caused.

For another example, the memory controller 120 may control an operation of writing data to be performed in only a specific region (i.e., a target memory block pool TGT_MB_POOL described below) of the nonvolatile memory set 110 during the target time period TP. This scheme allows an operation of writing data during the target time period TP while preventing data written during the target time period TP from exerting an influence on the determination of the operation mode OP_MODE. According to this scheme, since the memory controller 120 writes data even during the target time period TP, degradation in data write performance may be prevented or at least minimized.

In detail, during the target time period TP, the memory controller 120 may write data to a memory block included in a target memory block pool TGT_MB_POOL included in the nonvolatile memory set 110.

The target memory block pool TGT_MB_POOL may include at least one memory block.

For example, in FIG. 7, the memory controller 120 may write data to memory blocks ① and ② among four memory blocks in the target memory block pool TGT_MB_POOL, during the target time period TP.

On the other hand, the memory controller 120 may write data to a memory block not in the target memory block pool TGT_MB_POOL, during a time other than the target time period TP.

For example, in FIG. 8, before entering the target time period TP, that is, before the time T1, the memory controller 120 may write data to memory blocks ① and ② not included in the target memory block pool TGT_MB_POOL among the memory blocks in the nonvolatile memory set 110.

Thereafter, during the target time period TP, the memory controller 120 may write data to memory blocks ③ and ④ in the target memory block pool TGT_MB_POOL.

Afterwards, at a time after the target time period TP, that is, after the time T2, the memory controller 120 may write data to memory blocks ⑤ and ⑥ not included in the target memory block pool TGT_MB_POOL.

Therefore, the memory controller 120 may determine whether data is written during the target time period TP, depending on whether a memory block to which the corresponding data is written is in the target memory block pool TGT_MB_POOL.

As described above, the change from the second operation mode OP_MODE_2 to the first operation mode OP_MODE_1 may be performed manually, but may not be performed automatically. Hereinafter, an example of changing the operation mode OP_MODE for the nonvolatile memory set 110 from the second operation mode OP_MODE_2 to the first operation mode OP_MODE_1 at time T1 is described with reference to FIG. 9.

Figure 9:
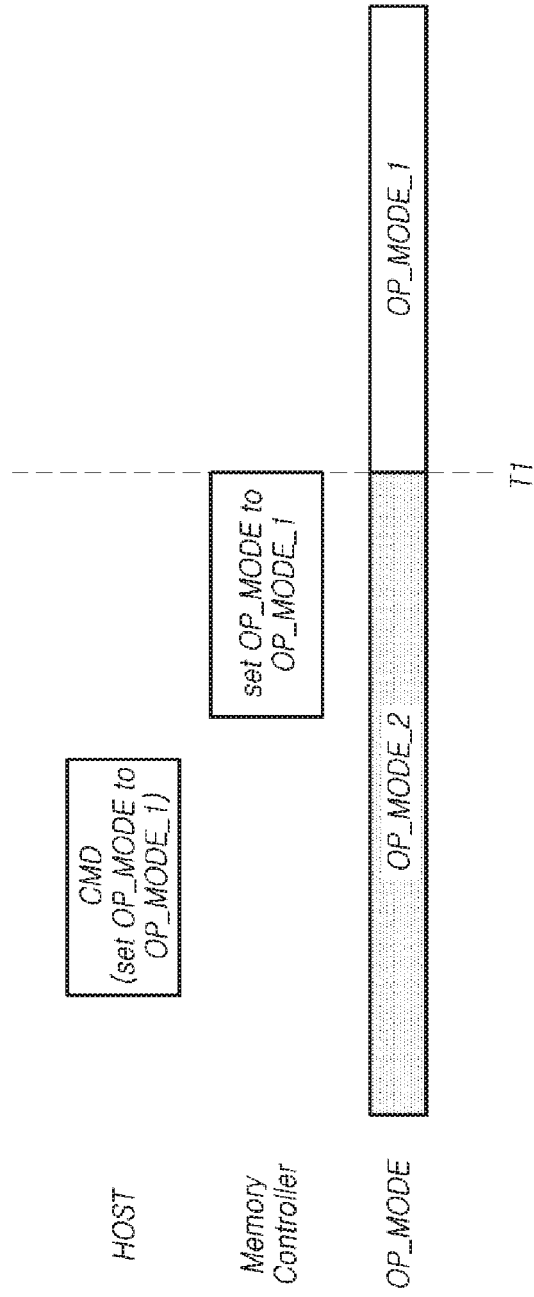
FIG. 9 is a diagram to assist in the explanation of an example of when an operation mode of a nonvolatile memory set is changed in accordance with an embodiment of the disclosure.

FIG. 9 is a diagram to assist in the explanation of an example of changing an operation mode of the nonvolatile memory set at a particular time in accordance with an embodiment of the disclosure.

When the memory controller 120 receives, from the host, an operation mode setting command which instructs the memory controller 120 to set the operation mode OP_MODE for the nonvolatile memory set 110 to the first operation mode OP_MODE_1, the memory controller 120 may change the operation mode OP_MODE from the second operation mode OP_MODE_2 to the first operation mode OP_MODE_1.

Hereinafter, the reason why the memory controller 120 writes data to the target memory block pool TGT_MB_POOL during the target time period TP is described.

In order to detect when to change the operation mode OP_MODE from the second operation mode OP_MODE_2 to the first operation mode OP_MODE_1, the memory controller 120 may calculate the value of a write attribute WRITE_ATTR indicating the count of write operations that are allowed to be performed in the first operation mode OP_MODE_1.

The value of the write attribute WRITE_ATTR may be determined in various ways. For example, the value of the write attribute WRITE_ATTR may be determined based on the number of free memory blocks capable of storing data, among the memory blocks in the nonvolatile memory set 110.

The host may expect how much data may be written in the first operation mode OP_MODE_1 in the future, by using the value of the write attribute WRITE_ATTR calculated by the memory controller 120. For example, if a current value of the write attribute WRITE_ATTR is 4, the host may expect that the memory controller 120 will change the operation mode OP_MODE from the first operation mode OP_MODE_1 to the second operation mode OP_MODE_2 when data corresponding to the size of four memory blocks is further written in the future.

Such a value of the write attribute WRITE_ATTR may be updated whenever a write operation is executed in the first operation mode OP_MODE_1, and the memory controller 120 may change the operation mode OP_MODE from the first operation mode OP_MODE_1 to the second operation mode OP_MODE_2, based on the updated value of the write attribute WRITE_ATTR.

For example, if a value of the write attribute WRITE_ATTR is equal to or less than a set threshold write attribute value, the number of free memory blocks is deemed insufficient and thus the memory controller 120 may change the operation mode OP_MODE from the first operation mode OP_MODE_1 to the second operation mode OP_MODE_2 so that garbage collection (i.e., the background operation) may be performed.

As described above, since there is a possibility that, during the target time period TP, the host and the memory controller 120 may differently determine the operation mode OP_MODE in which an operation of writing data is performed, there is a possibility that a value of the write attribute WRITE_ATTR determined by the host and a value of the write attribute WRITE_ATTR determined by the memory controller 120 may be different from each other.

Figure 10:
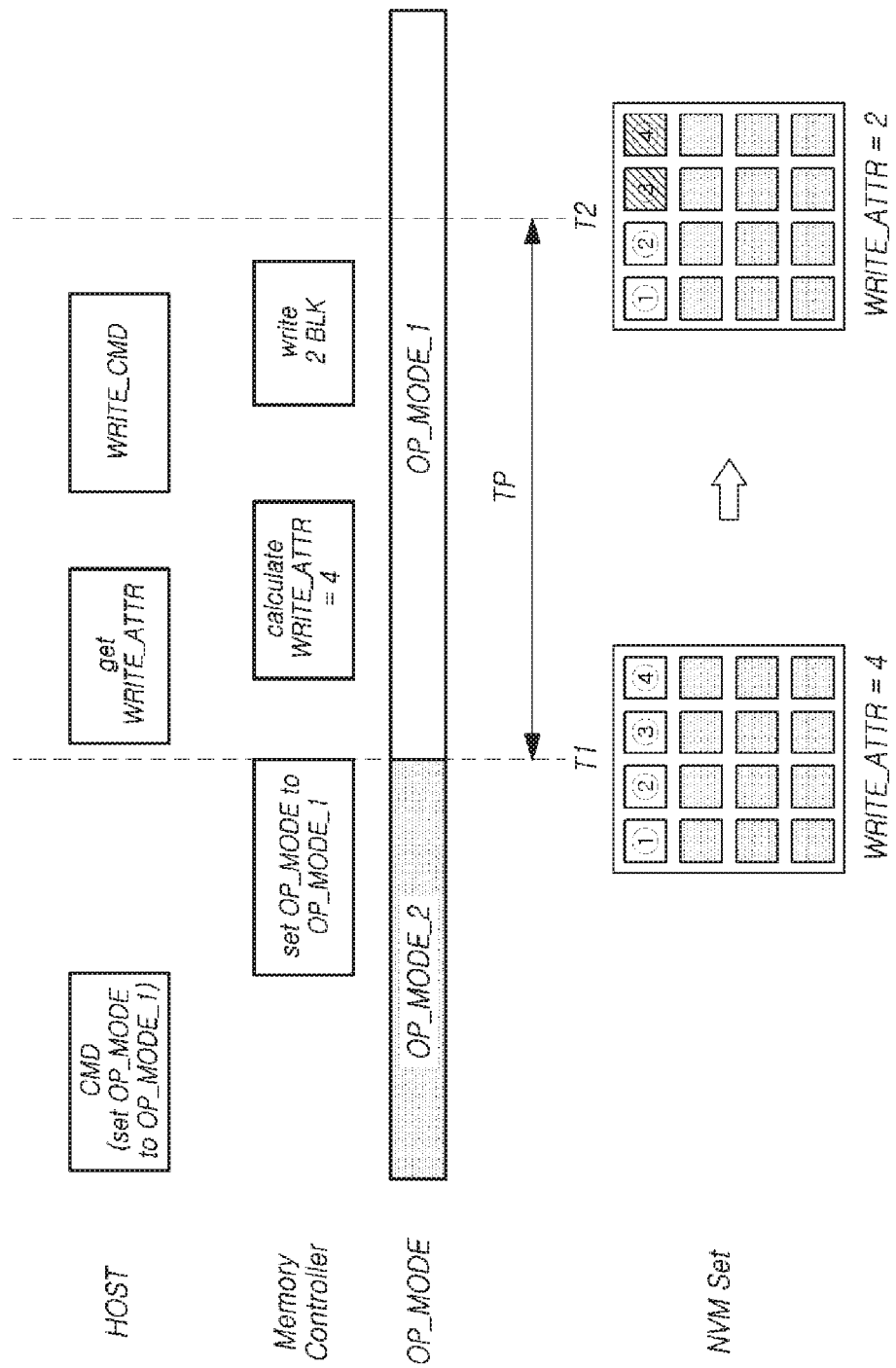
FIG. 10 is a diagram to assist in the explanation of an operation in which the value of a write attribute for a nonvolatile memory set varies in accordance with an embodiment of the disclosure varies.

FIG. 10 is a diagram to assist in the explanation of an example of an operation in which the value of a write attribute for the nonvolatile memory set in accordance with an embodiment of the disclosure varies.

In FIG. 10, it is assumed that four free memory blocks ①, ②, ③ and ④ exist in the nonvolatile memory set 110 and a value of the write attribute WRITE_ATTR represents the number of free memory blocks.

First, if the memory controller 120 receives, from the host, an operation mode setting command which instructs the memory controller 120 to set the operation mode OP_MODE for the nonvolatile memory set 110 to the first operation mode OP_MODE_1, the operation mode OP_MODE is changed from the second operation mode OP_MODE_2 to the first operation mode OP_MODE_1 at the time point T1.

In order to determine information on the number of write operations that may be performed in the first operation mode OP_MODE_1, the host may request a value of the write attribute WRITE_ATTR to the memory controller 120. If the corresponding request is received from the host, the memory controller 120 may calculate the write attribute WRITE_ATTR value as 4, which is the number of free memory blocks currently in the nonvolatile memory set 110, and may provide the host with the write attribute WRITE_ATTR in response.

There may be a case in which data is written into the nonvolatile memory set 110 during the target time period TP between time T1 and the time T2 at which the memory controller 120 receives, from the host, a command including information indicating that the host expects a requested operation to be performed in the first operation mode OP_MODE_1.

As an example, a write command transmitted by the host before the target time period TP may be performed during the target time period TP. As another example, a write command not including information indicating that the host expects a requested operation to be performed in the first operation mode OP_MODE_1 may be serviced during the target time period TP.

As such, it is assumed that data is written in the free memory blocks ③ and ④ in the nonvolatile memory set 110 during the target time period TP.

Since the operation mode OP_MODE during the target time period TP is the first operation mode OP_MODE_1, a value of the write attribute WRITE_ATTR at the time T2 is 2, which is the number of remaining free memory blocks. Even so, the host still determines the value of the write attribute WRITE_ATTR to be 4, which is the value received from the memory controller 120. Therefore, in this case, a problem may occur in that a time at which the operation mode OP_MODE is changed from the first operation mode OP_MODE_1 to the second operation mode OP_MODE_2 after time T2 is sooner than the time at which the host expects due to the discrepancy of the write attribute WRITE_ATTR.

Thus, in order to prevent such a problem from occurring, the memory controller 120 does not change, during the target time period TP, a value of the write attribute WRITE_ATTR indicating the number of write operations that are allowed to be performed in the first operation mode OP_MODE_1.

Figure 11:
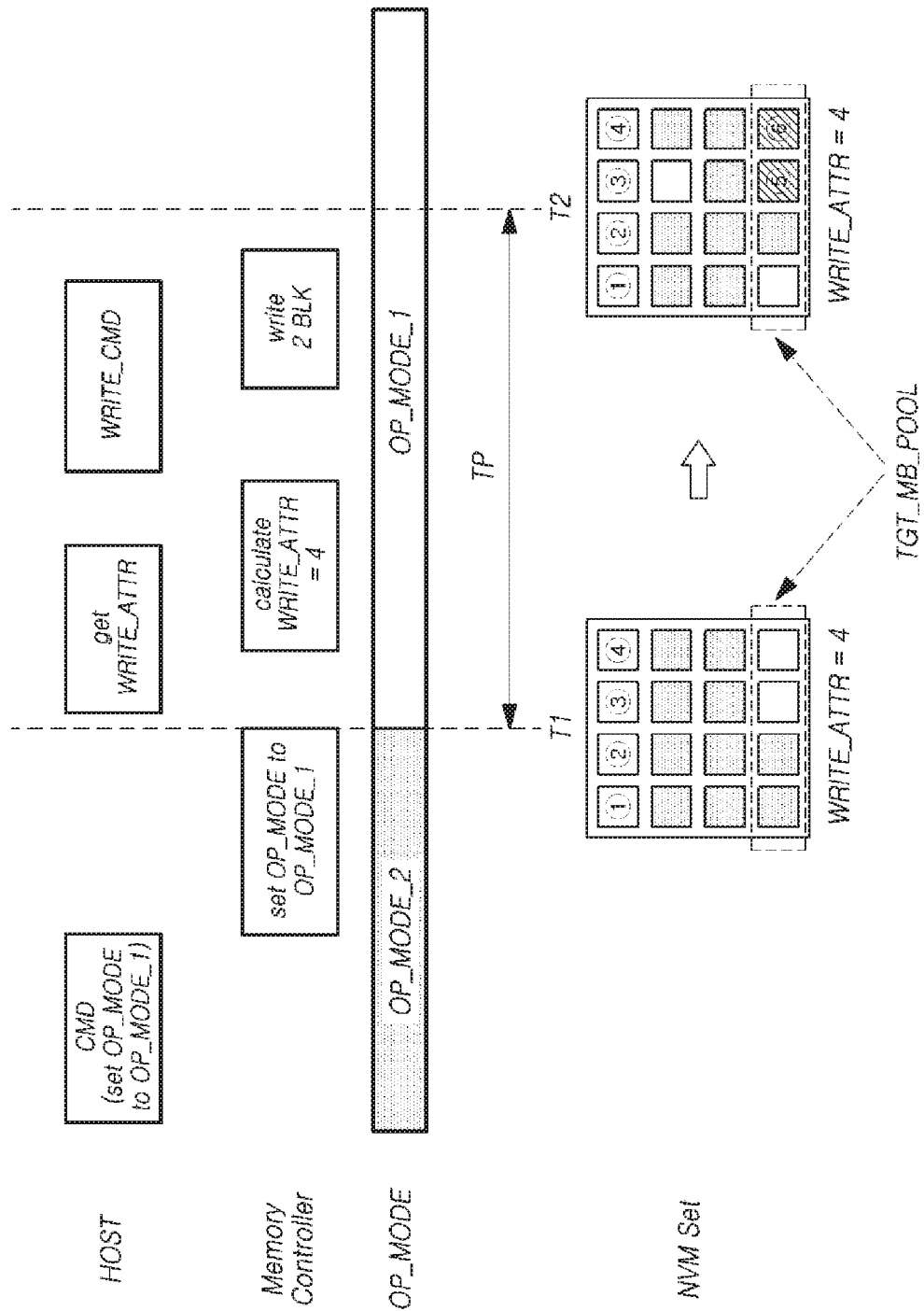
FIG. 11 is a diagram to assist in the explanation of an operation in which the value of a write attribute for a nonvolatile memory set is changed in accordance with another embodiment of the disclosure.

FIG. 11 is a diagram to assist in the explanation of another example of the operation in which the value of a write attribute for the nonvolatile memory set in accordance with an embodiment of the disclosure is changed.

Compared to FIG. 10, FIG. 11 illustrates a case in which data is written, during the target time period TP, not in the free memory blocks ①, ②, ③ and ④, but in memory blocks ⑤ and ⑥ in the target memory block pool TGT_MB_POOL. In this case, since the free memory blocks ①, ②, ③ and ④ are maintained as free memory blocks, even at time T2, a value of the write attribute WRITE_ATTR is also maintained as 4. Namely, the memory controller 120 may not change a value of the write attribute WRITE_ATTR during the target time period TP.

Therefore, at time T2, a value of the write attribute WRITE_ATTR determined by the host and a value of the write attribute WRITE_ATTR determined by the memory controller 120 agree with each other. Thus, even though data is written during the target time period TP, the host may use a value of the write attribute WRITE_ATTR provided from the memory controller 120 as it is. The host may count a number of write operations performed after the target time period TP in the first operation mode OP_MODE_1; and may compare the counted number with the value of the write attribute WRITE_ATTR determined by the memory controller 120, which allows the host to accurately determine when the operation mode OP_MODE is changed from the first operation mode OP_MODE_1 to the second operation mode OP_MODE_2.

Further, since the host may accurately determine a time at which the operation mode OP_MODE is expected to be changed from the first operation mode OP_MODE_1 to the second operation mode OP_MODE_2, the host may properly prepare for a delay of the expected time (i.e., when the operation mode OP_MODE is changed from the first operation mode OP_MODE_1 to the second operation mode OP_MODE_2) due to background operations.

In a process in which the memory controller 120 writes data to the target memory block pool TGT_MB_POOL during the target time period TP as illustrated in FIG. 11, an unexpected problem may occur. In this case, the memory controller 120 may generate event information EVENT indicating that such a problem has occurred, and may transmit the event information EVENT to the host so that the host may cope with such a problem. Hereinafter, an example in which the memory controller 120 generates such event information EVENT and transmits the event information EVENT to the host is described in detail.

Figure 12:
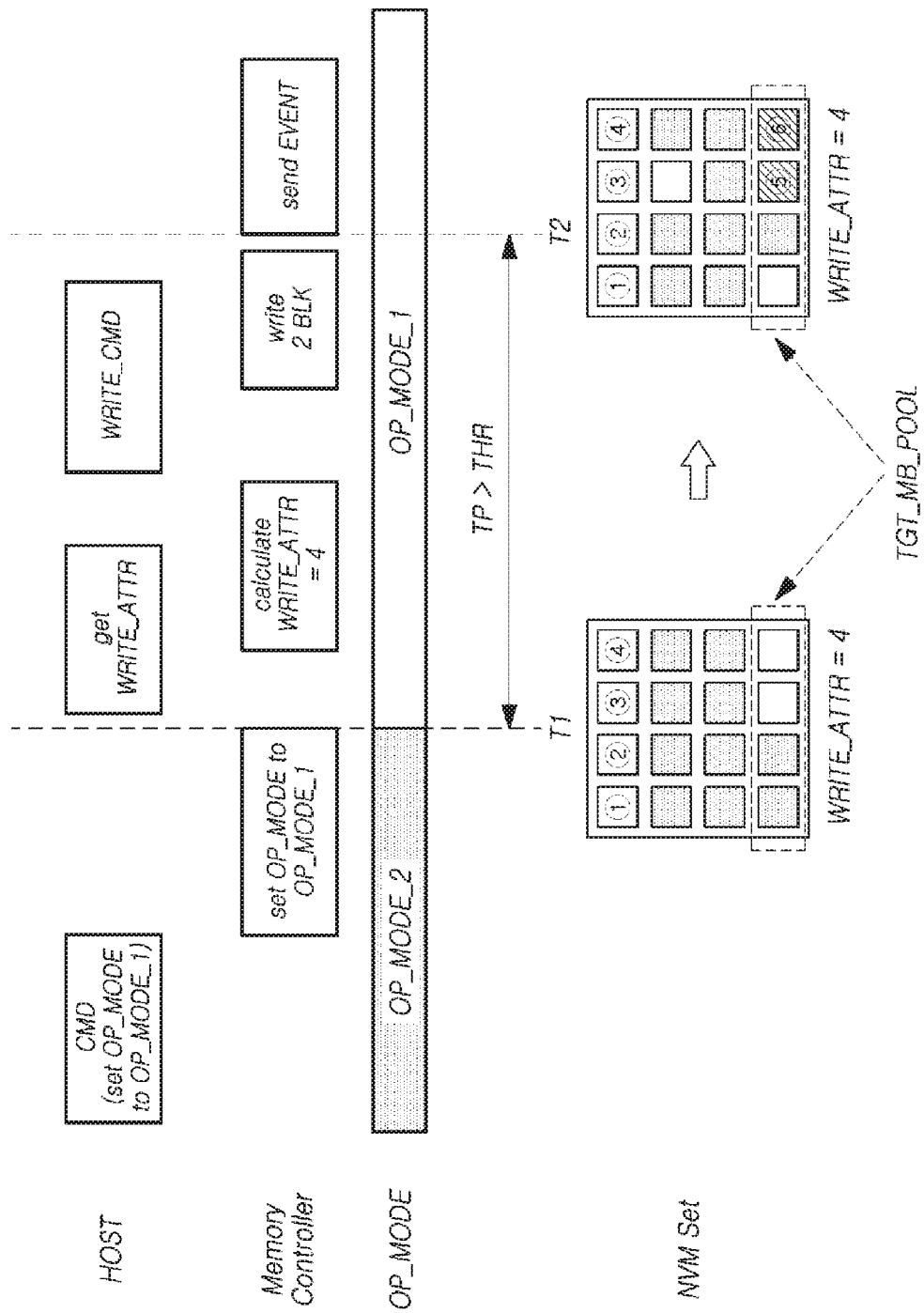
FIGS. 12 and 13 are diagrams to assist in the explanation of a memory controller that transmits event information to a host in accordance with an embodiment of the disclosure.
Figure 13:
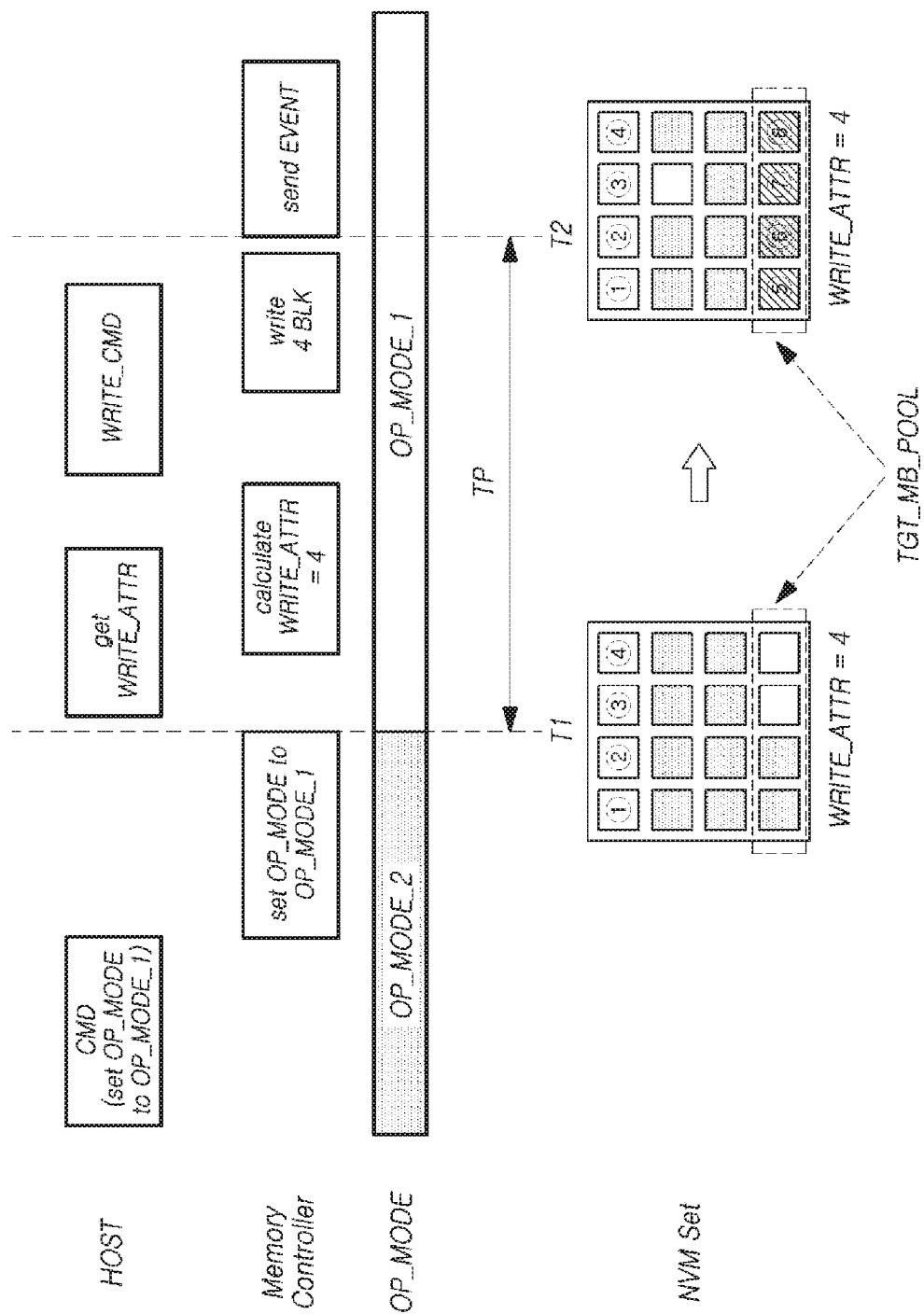

FIGS. 12 and 13 are diagrams to assist in the explanation of examples in which the memory controller in accordance with an embodiment of the disclosure transmits event information to the host.

Referring to FIG. 12, when a length of the target time period TP is equal to or longer than a set threshold time period value THR, the memory controller 120 may transmit event information EVENT to the host without a request from the host.

The event information EVENT may indicate that a length of the target time period TP is equal to or longer than the set threshold time period value THR, and may be asynchronously transmitted to the host without a request from the host. If the host receives the corresponding event information EVENT, since a length of the target time period TP is longer than expected, the host may determine that there is a possibility that a value of the write attribute WRITE_ATTR received from the memory controller 120 may be incorrect.

Referring to FIG. 13, if there is no free memory block to which data may be written, among the memory blocks in the target memory block pool TGT_MB_POOL, the memory controller 120 may transmit the event information EVENT to the host without a request from the host.

In the case where an amount of data written to the nonvolatile memory set 110 during the target time period TP is large, data may be written in all memory blocks ⑤, ⑥, ⑦ and ⑧ included in the target memory block pool TGT_MB_POOL, before the time point T2. In this case, when data is to be written before the time point T2, the memory controller 120 needs to write the data to memory blocks ①, ②, ③ and ④ other than memory blocks in the target memory block pool TGT_MB_POOL. Therefore, there is a possibility that a value of the write attribute WRITE_ATTR decreases to less than 4. Therefore, the memory controller 120 may transmit the event information EVENT to the host so that the host may recognize such a situation.

The event information EVENT may indicate that there is no free memory block to which data may be written, among the memory blocks included in the target memory block pool TGT_MB_POOL, and may be asynchronously transmitted to the host without a request from the host. If the host receives the corresponding event information EVENT, since it is no longer possible to write data to the target memory block pool TGT_MB_POOL, the host may determine that there is a possibility that a value of the write attribute WRITE_ATTR received from the memory controller 120 may be incorrect.

If the memory controller 120 writes data to the target memory block pool TGT_MB_POOL as described above, the number of free memory blocks included in the target memory block pool TGT_MB_POOL decreases.

Therefore, in order to allow data to be written to the target memory block pool TGT_MB_POOL during a subsequent target time period TP, the memory controller 120 should perform a background operation BG_OP to secure free memory blocks included in the target memory block pool TGT_MB_POOL.

Figure 14:
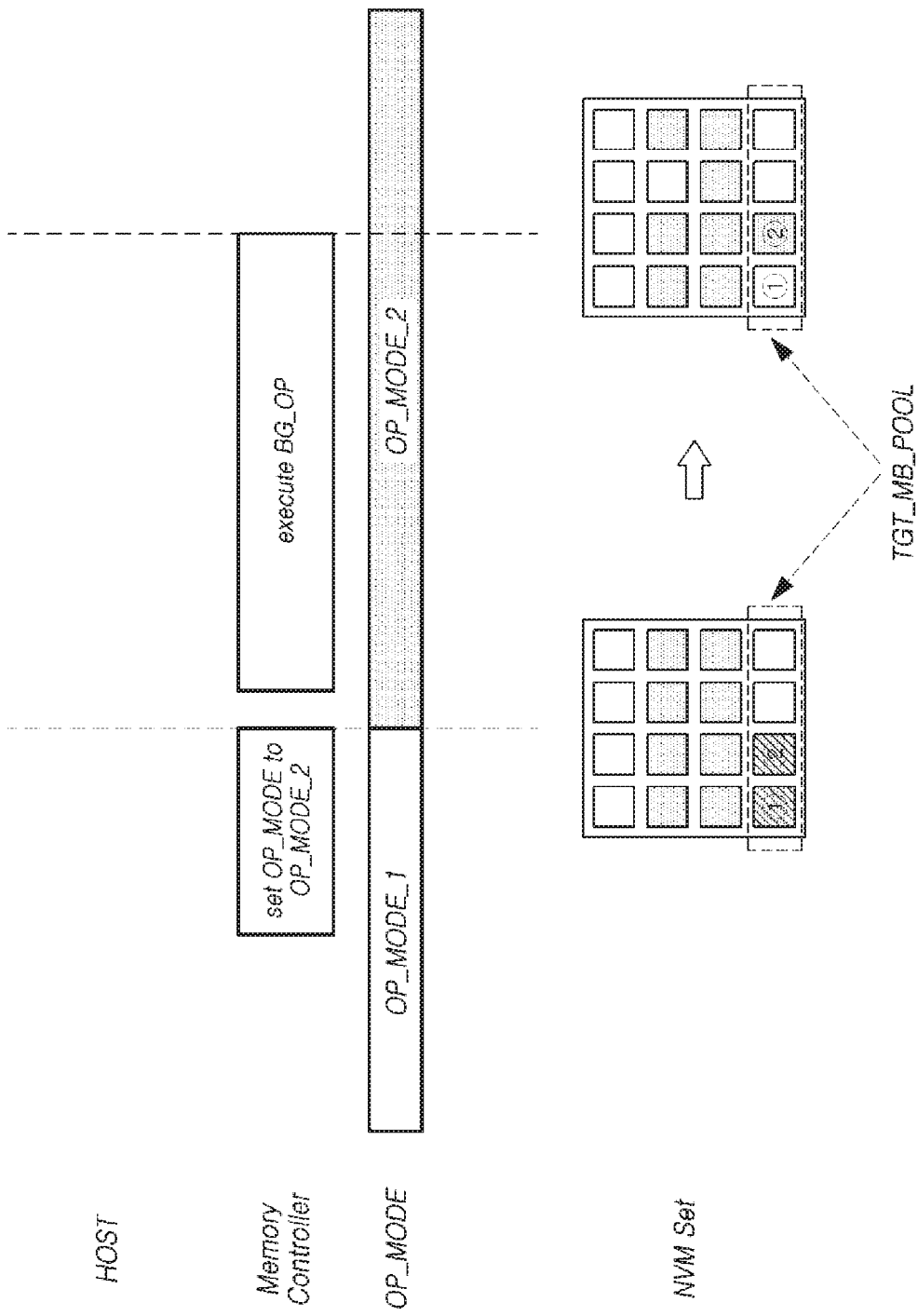
FIG. 14 is a diagram to assist in the explanation of an operation in which the memory controller executes a background operation in accordance with an embodiment of the disclosure.

FIG. 14 is a diagram to assist in the explanation of an example of an operation in which the memory controller in accordance with an embodiment of the disclosure executes a background operation.

When the operation mode OP_MODE is the second operation mode OP_MODE_2, the memory controller 120 may execute a background operation BG_OP (e.g., garbage collection) for memory blocks in the target memory block pool TGT_MB_POOL, and thereby, may generate free memory blocks to which data may be written, among the memory blocks in the target memory block pool TGT_MB_POOL.

In FIG. 14, the memory controller 120 may execute the background operation BG_OP when the operation mode OP_MODE is the second operation mode OP_MODE_2, and thereby, may change memory blocks ① and ② which are written with data among the memory blocks included in the target memory block pool TGT_MB_POOL, into free memory blocks.

Figure 15:
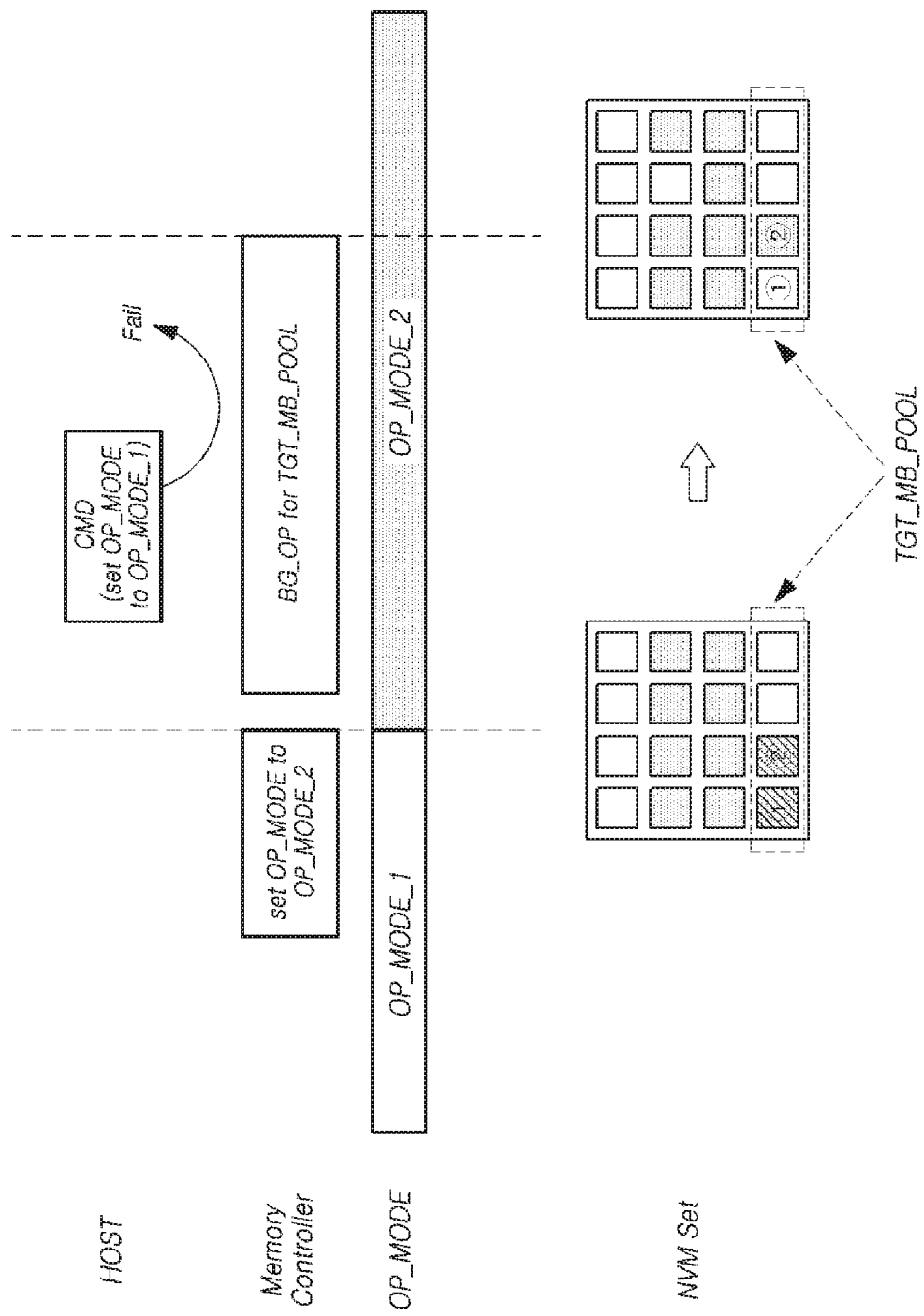
FIG. 15 is a diagram to assist in the explanation of an operation in which the memory controller executes a background operation in accordance with another embodiment of the disclosure.

FIG. 15 is a diagram to assist in the explanation of another example of the operation in which the memory controller in accordance with an embodiment of the disclosure executes a background operation.

Referring to FIG. 15, when the memory controller 120 executes a background operation BG_OP (e.g., garbage collection) for memory blocks in the target memory block pool TGT_MB_POOL, in the second operation mode OP_MODE_2, the host may transmit to the memory controller 120 a command instructing the memory controller 120 to change the operation mode OP_MODE to the first operation mode OP_MODE_1.

At this time, the memory controller 120 may control the operation mode OP_MODE to block or prohibit a change to the first operation mode OP_MODE_1, while the memory controller 120 executes the background operation BG_OP for the memory blocks included in the target memory block pool TGT_MB_POOL. This is because, if the operation mode OP_MODE is changed to the first operation mode OP_MODE_1 in a state in which free memory blocks are not yet secured in the target memory block pool TGT_MB_POOL, there may occur a situation in which there is no free memory block to which data may be written among the memory blocks in the target memory block pool TGT_MB_POOL, as described above with reference to FIG. 13.

Therefore, the memory controller 120 may maintain the operation mode OP_MODE as the second operation mode OP_MODE_2, and, when the host transmits a command instructing the memory controller 120 to change the operation mode OP_MODE to the first operation mode OP_MODE_1, may respond to the host with information indicating that the requested change has failed or is blocked.

Figure 16:
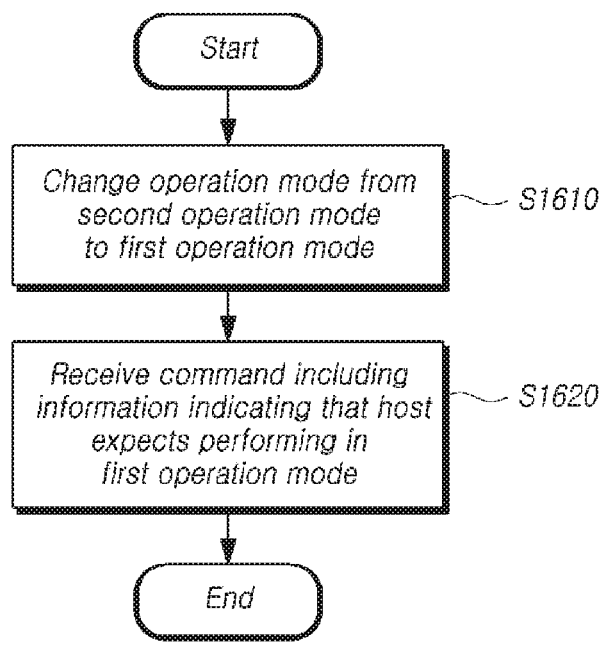
FIG. 16 is a flow chart to assist in the explanation of a method for operating the memory controller in accordance with an embodiment of the disclosure.

FIG. 16 is a flow chart to assist in the explanation of a method for operating the memory controller 120 in accordance with an embodiment of the disclosure.

First, the method for operating the memory controller 120 may include changing the operation mode OP_MODE for the nonvolatile memory set 110 from the second operation mode OP_MODE_2 to the first operation mode OP_MODE_1 (S1610).

The difference between the first operation mode OP_MODE_1 and the second operation mode OP_MODE_2 may be identified by whether a background operation may be executed, as described above. That is to say, if the operation mode OP_MODE is the first operation mode OP_MODE_1, a background operation for the nonvolatile memory set 110 is not executed, and if the operation mode OP_MODE is the second operation mode OP_MODE_2, a background operation for the nonvolatile memory set 110 is executable.

The method for operating the memory controller 120 may include receiving, from the host, a command including information indicating that the host expects a requested operation to be performed in the first operation mode OP_MODE_1 (S1620).

At a time between the steps S1610 and S1620, that is, during the target time period TP defined by 1) the time T1 at which the operation mode OP_MODE for the nonvolatile memory set 110 is changed from the second operation mode OP_MODE_2 to the first operation mode OP_MODE_1 and 2) the time T2 at which a command including information indicating that the host expects a requested operation to be performed in the first operation mode OP_MODE_1 is received from the host, data may be written to a memory block included in the target memory block pool TGT_MB_POOL included in the nonvolatile memory set 110.

On the other hand, during a period other than the target time period TP described above, data may be written to a memory block not in the target memory block pool TGT_MB_POOL.

Also, during the above-described target time period TP, as described above with reference to FIG. 11, a value of the write attribute WRITE_ATTR indicating the number of write operations that are allowed to be performed in the first operation mode OP_MODE_1 may not be changed.

Moreover, when the operation mode OP_MODE is the second operation mode OP_MODE_2, as described with reference to FIG. 13, a background operation may be executed for memory blocks in the target memory block pool TGT_MB_POOL, and thereby, free memory blocks to which data may be written may be generated among the memory blocks in the target memory block pool TGT_MB_POOL.

The above-described operation of the memory controller 120 may be controlled by the control circuit 123, and may be performed in such a manner that the processor 124 executes (drives) a firmware in which general operations of the memory controller 120 are programmed.

Figure 17:
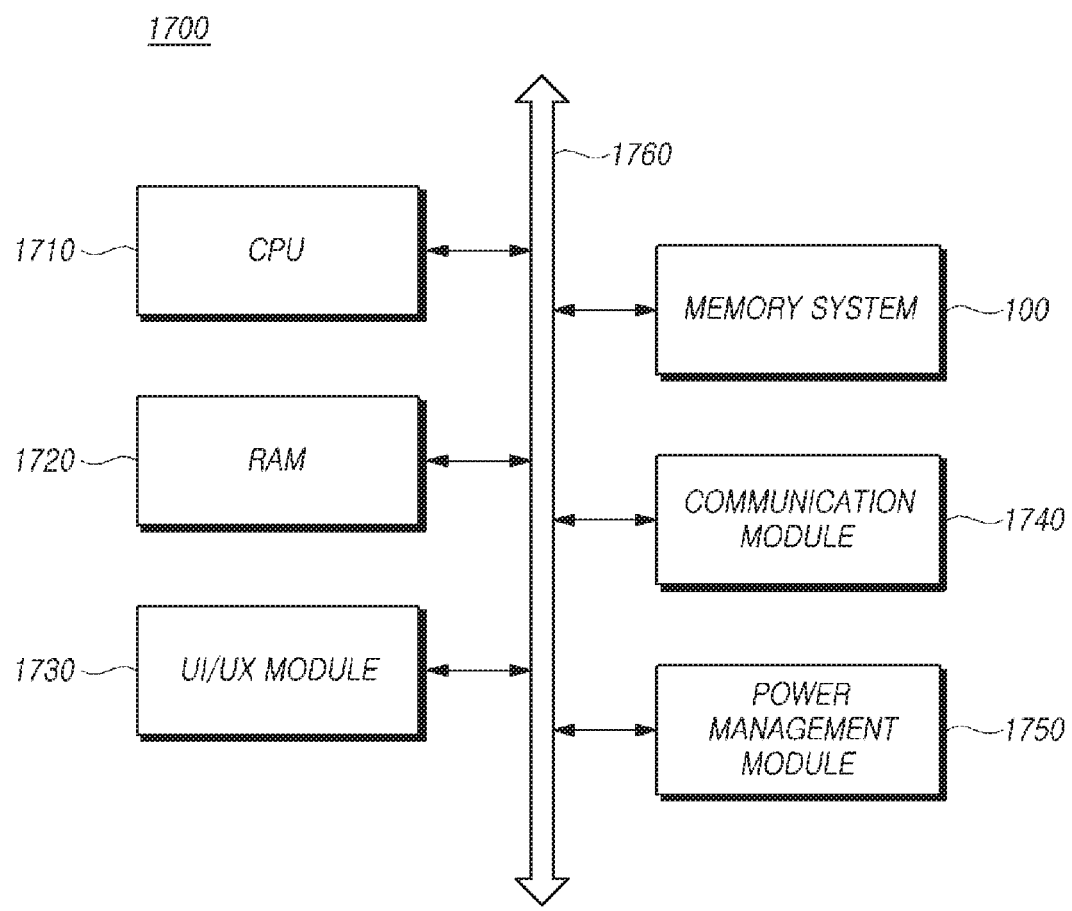
FIG. 17 is a block diagram schematically illustrating a computing system in accordance with an embodiment of the disclosure.

FIG. 17 is a block diagram schematically illustrating a computing system 1700 in accordance with an embodiment of the disclosure.

Referring to FIG. 17, the computing system 1700 may include a memory system 100, a central processing unit (CPU) 1710 for controlling general operations of the computing system 1700, a RAM 1720 for storing data and information related with the operations of the computing system 1700, a UI/UX (user interface/user experience) module 1730 for providing a user environment, a communication module 1740 for communicating with an external device in a wired and/or wireless manner and a power management module 1750 for managing power used by the computing system 1700, which are electrically coupled to a system bus 1760.

The computing system 1700 may include a PC (personal computer), a mobile terminal such as a smartphone or a tablet, or any of various other electronic devices.

The computing system 1700 may further include a battery for supplying an operating voltage, and may further include an application chipset, a graphic-related module, a camera image processor (CIS), and a DRAM. As those skilled in the art can appreciate, the computing system 1700 may include other components.

The memory system 100 may be of various types in including a type which stores data in a magnetic disk, such as a hard disk drive (HDD), and a type which stores data in a nonvolatile memory, such as a solid state drive (SDD), a universal flash storage (UFS) device or an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and/or an FRAM (ferroelectric RAM). In addition, the memory system 100 may be realized as any of various types of storage devices, and may be mounted in various electronic devices.

As is apparent from the above description, according to embodiments of the disclosure, it is possible to provide a memory system, a memory controller and a method for operating the memory controller, capable of preventing a problem in which states determined by a host and the memory controller during a specific time period do not coincide with each other.

Also, according to embodiments of the disclosure, it is possible to provide a memory system, a memory controller and a method for operating the memory controller, capable of enabling a host to prepare for a situation in which a delay time increases more than expected.

Although various embodiments of the invention have been illustrated and described, those skilled in the art will appreciate, in light of the present disclosure, that various modifications, additions and substitutions are possible, without departing from the scope and spirit of the invention. Therefore, the disclosed embodiments are presented in a descriptive sense, not for limiting the scope of the invention. The present invention encompasses all variations of any of the disclosed embodiments that fall within the scope of the claims including their equivalents.

What is claimed is:

1. A memory system comprising:
   a nonvolatile memory set including at least one nonvolatile memory; and
   a memory controller configured to:
   control the nonvolatile memory set;
   write data to a memory block in a target memory block pool in the nonvolatile memory set during a target time period from 1) a time at which an operation mode for the nonvolatile memory set is changed from a second operation mode to a first operation mode to 2) a time at which a command including information indicating that a host expects a requested operation to be performed in the first operation mode is received from the host;

prevent execution of a background operation for the nonvolatile memory set when the operation mode is the first operation mode; and control a background operation for the nonvolatile memory set to be executable when the operation mode is the second operation mode.

2. The memory system according to claim 1, wherein the memory controller is further configured to write data to a memory block not in the target memory block pool during a time other than the target time period.

3. The memory system according to claim 1, wherein, when an operation mode setting command instructing the memory controller to set the operation mode for the nonvolatile memory set to the first operation mode is received from the host, the memory controller changes the operation mode from the second operation mode to the first operation mode.

4. The memory system according to claim 1, wherein, during the target time period, the memory controller does not change a value of a write attribute indicating information on a number of write operations that are allowable in the first operation mode.

5. The memory system according to claim 1, wherein, when the target time period is equal to or longer than a set threshold time period, the memory controller transmits event information to the host.

6. The memory system according to claim 1, wherein, when there is no free memory block to which data is able to be written among memory blocks in the target memory block pool, the memory controller transmits event information to the host.

7. The memory system according to claim 1, wherein, in the second operation mode, the memory controller is further configured to execute a background operation for a memory block in the target memory block pool to secure a free memory block to which data is able to be written, among the memory blocks in the target memory block pool.

8. The memory system according to claim 7, wherein the memory controller is further configured to prohibit change to the first operation mode while the background operation is executed and until the free memory block is secured.

9. A memory controller comprising:
a memory interface configured to communicate with a nonvolatile memory set including at least one nonvolatile memory; and
a control circuit configured to:
control the nonvolatile memory set;
write data to a memory block in a target memory block pool in the nonvolatile memory set during a target time period from 1) a time at which an operation mode for the nonvolatile memory set is changed from a second operation mode to a first operation mode to 2) a time at which a command including information indicating that a host expects a requested operation to be performed in the first operation mode is received from the host;
prevent execution of a background operation for the nonvolatile memory set when the operation mode is the first operation mode; and
control a background operation for the nonvolatile memory set to be executable when the operation mode is the second operation mode.

10. The memory controller according to claim 9, wherein the control circuit is further configured to write data to a memory block not in the target memory block pool during a time other than the target time period.

11. The memory controller according to claim 9, wherein, when an operation mode setting command instructing the control circuit to set the operation mode for the nonvolatile memory set to the first operation mode is received from the host, the control circuit changes the operation mode from the second operation mode to the first operation mode.

12. The memory controller according to claim 11, wherein, during the target time period, the control circuit does not change a value of a write attribute indicating information on a number of write operations that are allowable in the first operation mode.

13. The memory controller according to claim 11, wherein, when the target time period is equal to or longer than a set threshold time period, the control circuit transmits event information to the host.

14. The memory controller according to claim 9, wherein, when there is no free memory block to which data is able to be written does among memory blocks in the target memory block pool, the control circuit transmits event information to the host.

15. The memory controller according to claim 9, wherein, in the second operation mode, the control circuit is further configured to execute a background operation for a memory block in the target memory block pool to secure a free memory block to which data is able to be written, among the memory blocks in the target memory block pool.

16. The memory controller according to claim 15, wherein the control circuit is further configured to prohibit change to the first operation mode while the background operation is executed and until the free memory block is secured.

17. A method for operating a memory controller suitable for controlling a nonvolatile memory set including at least one nonvolatile memory, the method comprising:
changing an operation mode for the nonvolatile memory set from a second operation mode to a first operation mode;
receiving, from a host, a command including information indicating that the host expects a requested operation to be performed in the first operation mode;
writing data to a memory block in a target memory block pool in the nonvolatile memory set during a target time period from 1) a time at which an operation mode for the nonvolatile memory set is changed from a second operation mode to a first operation mode to 2) a time at which a command including information indicating that a host expects a requested operation to be performed in the first operation mode is received from the host;
preventing execution of a background operation for the nonvolatile memory set when the operation mode is the first operation mode; and
controlling a background operation for the nonvolatile memory set to be executable when the operation mode is the second operation mode.

18. The method according to claim 17, further comprising writing data to a memory block not in the target memory block pool during a time other than the target time period.

19. The method according to claim 17, further comprising maintaining a value of a write attribute indicating information on a number of write operations that are allowable in the first operation mode.

20. The method according to claim 19, further comprising, when in the second operation mode, executing a background operation for a memory block in the target memory block pool to secure a free memory block to which data is able to be written among memory blocks in the target memory block pool.

\* \* \* \* \*